(12) United States Patent
Moon et al.

(10) Patent No.: US 11,140,143 B2
(45) Date of Patent: Oct. 5, 2021

(54) DYNAMIC AND CRYPTOGRAPHICALLY SECURE AUGMENTATION OF PARTICIPANTS IN PROGRAMMATICALLY ESTABLISHED CHATBOT SESSIONS

(71) Applicant: The Toronto-Dominion Bank, Toronto (CA)

(72) Inventors: Tae Gyun Moon, Toronto (CA); Robert Alexander Mccarter, Eden (CA); Kheiver Kayode Roberts, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 142 days.

(21) Appl. No.: 16/377,831

(22) Filed: Apr. 8, 2019

(65) Prior Publication Data

US 2020/0322320 A1     Oct. 8, 2020

(51) Int. Cl.
| | |
|---|---|
| *H04L 29/06* | (2006.01) |
| *H04W 12/06* | (2021.01) |
| *G06F 21/31* | (2013.01) |
| *G06Q 20/32* | (2012.01) |
| *H04L 12/58* | (2006.01) |
| *G06Q 30/00* | (2012.01) |

(52) U.S. Cl.
CPC ............. *H04L 63/08* (2013.01); *G06F 21/31* (2013.01); *G06Q 20/3221* (2013.01); *G06Q 30/016* (2013.01); *H04L 51/02* (2013.01); *H04L 51/04* (2013.01); *H04L 65/1069* (2013.01); *H04W 12/06* (2013.01); *G06F 2221/2115* (2013.01)

(58) Field of Classification Search
None
See application file for complete search history.

(56) References Cited

U.S. PATENT DOCUMENTS

| | | | |
|---|---|---|---|
| 2016/0028715 A1* | 1/2016 | Sivashanmugam | G06Q 20/401 726/7 |
| 2018/0367964 A1* | 12/2018 | Vendrow | H04M 3/42153 |
| 2020/0311028 A1* | 10/2020 | Korepanov | G06F 16/178 |

\* cited by examiner

*Primary Examiner* — Andrew J Steinle
(74) *Attorney, Agent, or Firm* — Duane Morris LLP

(57) ABSTRACT

The disclosed exemplary embodiments include computer-implemented systems, apparatuses, and processes that dynamically and securely augment participants in programmatically established chatbot sessions. For example, an apparatus may obtain messaging data generated during a first communications session involving a first device and based on the messaging data, detecting an occurrence of an event that triggers an establishment of a second communications session involving the first device and a second device. The apparatus may generate and transmit, to the second device, notification data causing the second device to validate one or more authentication credentials, and may receive confirmation data indicative of the one or more validated authentication credentials from the second device. Based on the confirmation data, the apparatus may perform operations that establish the second communications session in accordance with at least a portion of the messaging data.

20 Claims, 16 Drawing Sheets

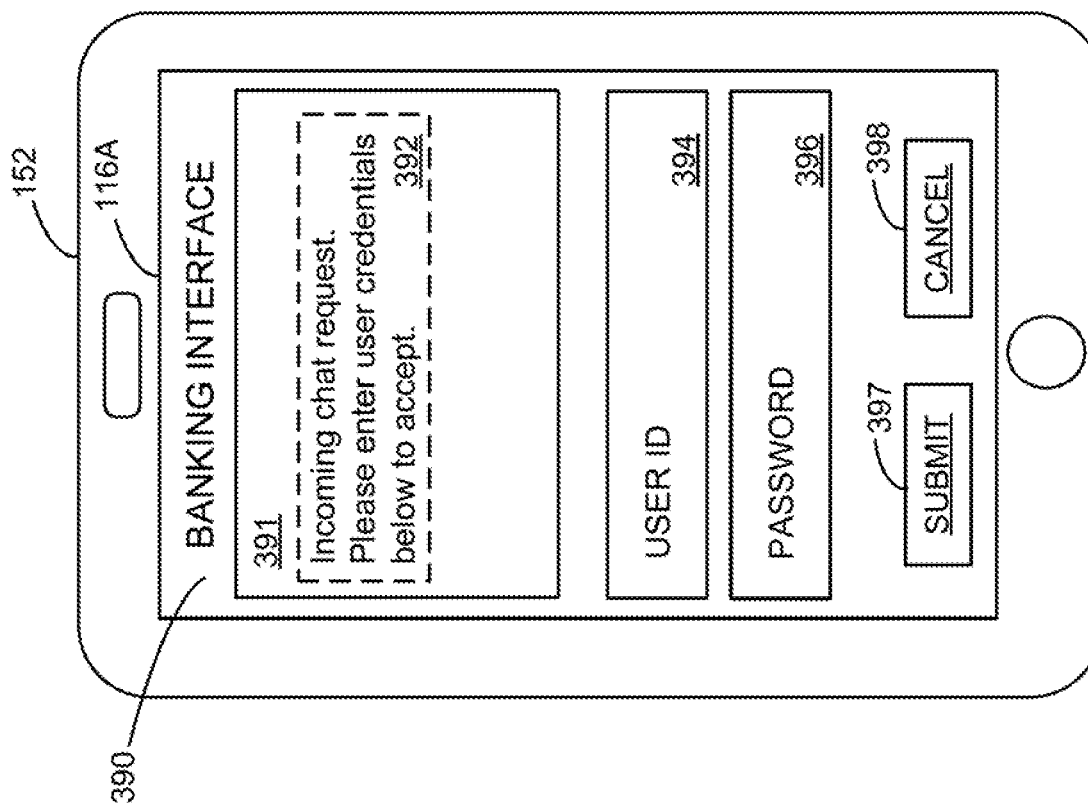

DYNAMIC AND CRYPTOGRAPHICALLY SECURE AUGMENTATION OF PARTICIPANTS IN PROGRAMMATICALLY ESTABLISHED CHATBOT SESSIONS

TECHNICAL FIELD

The disclosed embodiments generally relate to computer-implemented systems and processes that dynamically and securely augment participants in programmatically established chatbot sessions.

BACKGROUND

Today, many financial institutions, online retailers, and other businesses use chatbots to increase and improve a level of customer engagement between customers and corresponding digital platforms such as, but not limited to, websites, messaging applications, and mobile applications. These existing chatbots may receive a message from a customer's device (e.g., provided as input to a corresponding digital interface), programmatically generate responses to the received message, and generate and transmit, to the customer's device, a response to the received message for presentation within the digital interface.

SUMMARY

In some examples, an apparatus includes a communications unit, a memory storing instructions, and at least one processor coupled to the communications unit and the memory. The at least one processor is configured to execute the instructions to receive, via the communications unit, messaging data generated during a first communications session involving a first device, and based on the messaging data, detect an occurrence of an event that triggers an establishment of a second communications session involving the first device and a second device. The at least one processor is further configured to execute the instructions to generate and transmit, via the communications unit, a first signal to the second device that includes notification data associated with the second communications session. The notification data causes the second device to validate one or more authentication credentials, and the at least one processor is further configured to execute the instructions to receive, via the communications unit, a second signal from the second device. The second signal includes confirmation data indicative of the one or more validated authentication credentials. Based on the confirmation data, the at least one processor is further configured to execute the instructions to perform operations that establish the second communications session in accordance with at least a portion of the messaging data.

In other examples, a computer-implemented method includes obtaining, by at least one processor, messaging data generated during a first communications session involving a first device and based on the messaging data, detecting, by the at least one processor, an occurrence of an event that triggers an establishment of a second communications session involving the first device and a second device. The computer-implemented method also includes generating and transmitting, by the at least one processor, notification data associated with the second communications session to the second device, and the notification data causes the second device to validate one or more authentication credentials. The computer-implemented method also includes receiving, by the at least one processor, confirmation data indicative of the one or more validated authentication credentials from the second device and based on the confirmation data, and by the at least one processor, performing operations that establish the second communications session in accordance with at least a portion of the messaging data.

Further, in some examples, a tangible, non-transitory computer-readable medium stores instructions that, when executed by at least one processor, cause the at least one processor to perform a method that includes obtaining messaging data generated during a first communications session involving a first device and based on the messaging data, detecting an occurrence of an event that triggers an establishment of a second communications session involving the first device and a second device. The method also includes generating and transmitting notification data associated with the second communications session to the second device, and the notification data causes the second device to validate one or more authentication credentials. Further, the method includes receiving confirmation data indicative of the one or more validated authentication credentials from the second device, and based on the confirmation data, perform operations that establish the second communications session in accordance with at least a portion of the messaging data.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

BRIEF DESCRIPTION OF THE DRAWINGS

FIG. 3D is a diagram illustrating a portion of an exemplary graphical user interface, in accordance with some embodiments.

DETAILED DESCRIPTION

Certain of the exemplary processes described herein enable a network-connected computing system to detect, during an existing chatbot session with a user, an occurrence of an event triggering an augmentation of the existing chatbot session to include one or more third parties, e.g., in response to a detected request by the user, or based on a determination that an operation requested by the user requires a consent of the third party.

In some instances, the user and the third party may each operate a corresponding network-connected device, and each of the devices may execute a mobile application provisioned by the network-connected computing system, such as a mobile banking application. Based on the detected occurrence of the triggering event, the network-connected system may perform any of the exemplary processes described herein to generate and transmit a notification to the device of the third party that, when processed by the executed mobile application, causes the third-party device generate and render for presentation interface elements within a digital interface that prompt the third party to provide authentication credentials to the executed banking application.

The notification may also include data, e.g., a pointer, identifying elements of populated interface data that, when processed by the executed mobile application, provisions the existing chatbot session to a chatbot interface generated by executed mobile application. In some examples, as described herein, and responsive to a successful authentication at the third-party device, the network-connected computing system can provision the populated interface data to the third-party device, and augment the existing chatbot session with the user (e.g., participating using a corresponding chatbot interface presented at the user device) to include the third party (e.g., via a newly instantiated chatbot interface at the third-party device). In some instances, the augmentation of the existing chatbot session may be performed without terminating the existing chatbot session or closing the corresponding chatbot interface at the user device.

I. Exemplary Computing Environments

Figure 1:
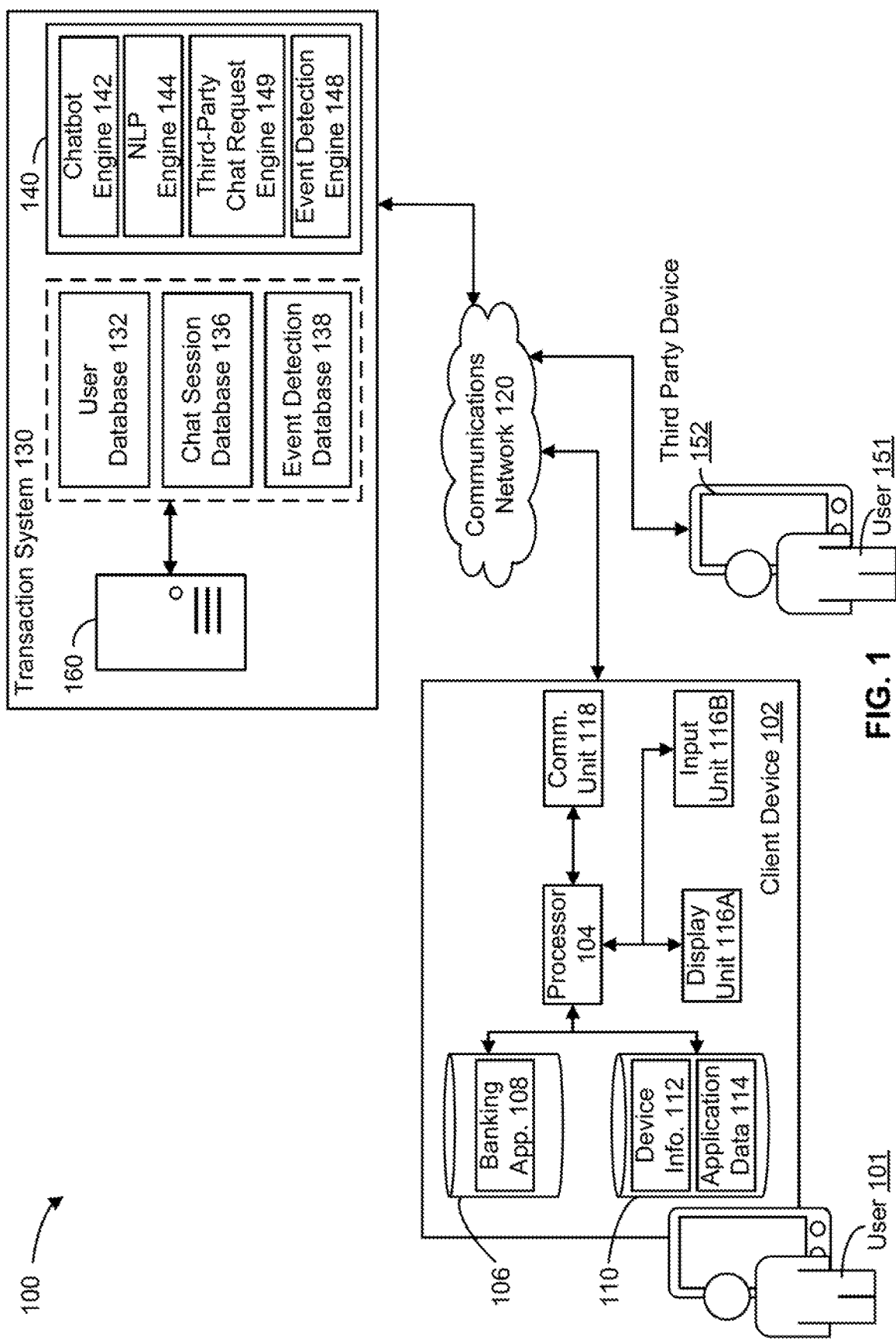
FIG. 1 is a block diagram of an exemplary computing environment, in accordance with some embodiments.

FIG. 1 is a diagram illustrating an exemplary computing environment 100 that includes a transaction system 130, a client device 102, and a third-party device 152, each of which are operatively connected to communications network 120. Examples of network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet. Although not shown, computing environment 100 may include additional devices, such as one or more additional client devices, one or more additional third-party devices, and additional network-connected computing systems. For simplicity, client device 102 is illustrated in greater detail than third-party device 152. However, third-party device 152 may include the same or similar functionality as described below in reference to client device 102.

In some embodiments, client device 102 and third-party device 152 may each include a computing device having one or more tangible, non-transitory memories that store data and/or software instructions, such as application repository 106, and one or more processors, such as processor 104, configured to execute the software instructions. The one or more tangible, non-transitory memories may, in some examples, store application programs, application modules, and other elements of code executable by the one or more processors. For example, as illustrated in FIG. 1, client device 102 may maintain, within application repository 106, an executable application associated with a financial institution, such as a banking application 108. Banking application 108 may be provisioned to client device 102 by transaction system 130, and in some instances (upon execution), may perform operations that establish a communications session with an application program executed by transaction system 130 (e.g., a chatbot session with a chatbot associated with a financial institution, as well as chatbot communications during the chatbot session). Transaction system 130 may also provision banking application 108 to third-party device 152. For example, a user (such as user 101) and each of the third parties (such as third party 151) can represent registered customers of the transaction system 130, where transaction system 130 provisions the executable banking application 108 to client device 102) and to each third-party device 152.

Application repository 106 may also include additional executable applications, such as one or more executable web browsers (e.g., Google Chrome™ Apple Safari™, etc.), for example. The disclosed embodiments, however, are not limited to these exemplary application programs, and in other examples, application repository 106 may include any additional or alternate application programs, application modules, or other elements of code executable by client device 102.

Client device 102 may also establish and maintain, within the one or more tangible, non-transitory memories, one or more structured or unstructured data repositories or databases. For example, data repository 110 may include device data 112 and application data 114. Device data 112 may include information that uniquely identifies client device 102, such as a media access control (MAC) address of client device 102 or an Internet Protocol (IP) address assigned to client device 102.

Application data 114 may include information that facilitates, or supports, an execution of any of the application programs described herein, such as, but limited to, supporting information that enables executable banking application 108 to authenticate an identity of user 101. Examples of this supporting information include, but are not limited to, one or more alphanumeric login or authentication credentials assigned to user 101 (e.g., by transaction system 130) or one or more biometric credentials of user 101, such as, but not limited to, fingerprint data or a digital facial image. Further, in some instances, application data 114 may include additional information that uniquely identifies one or more of the exemplary application programs described herein, such as a cryptogram associated with banking application 108.

Additionally, in some examples, client device 102 may include a display unit 116A configured to present interface elements to user 101, and an input unit 116B configured to receive input from a user of client device 102, such as user 101. For example, user 101 may provide input in response to interface elements presented through display unit 116A. By way of example, display unit 116A may include, but is not limited to, an LCD display unit or other appropriate type of display unit, and input unit 116B may include, but is not limited to, a keypad, keyboard, touchscreen, fingerprint scanner, voice activated control technologies, stylus, or any other appropriate type of input unit.

Further, in some examples, the functionalities of display unit 116A and input unit 116B may be combined into a single device, such as a pressure-sensitive touchscreen display unit that can present interface elements (e.g., graphical user interface) and can detect an input from user 101 via a physical touch. Client device 102 may also include a communications unit 118, such as a transceiver device, coupled to processor 104. Communications unit 118 may be configured by processor 104, and can establish and maintain communications with communications network 120 via a communications protocol, such as WiFi®, Bluetooth®, NFC, a cellular communications protocol (e.g., LTE®, CDMA®, GSM®, etc.), or any other suitable wired or wireless communications protocol.

As described herein, client device 102 may execute a locally maintained application program, such as banking application 108, which may cause client device 102 to generate and render a digital interface for presentation on a corresponding display unit, such as display unit 116A. In some instances, the digital interface may be associated with an exchange of data, such as a chat session data exchange with transaction system 130, capable of initiation by the executed application program (e.g., banking application 108). For example, the exchange of data may include a request by client device 102 to initiate a chatbot session with transaction system 130. The digital interface may include a discrete interface element designated to receive a data input by user 101 (e.g., via input unit 116B) to initiate the chatbot session with transaction system 130.

Examples of client device 102 and third-party device 152 may include, but are not limited to, a personal computer, a laptop computer, a tablet computer, a notebook computer, a hand-held computer, a personal digital assistant, a portable navigation device, a mobile phone, a smartphone, a wearable computing device (e.g., a smart watch, a wearable activity monitor, wearable smart jewelry, and glasses and other optical devices that include optical head-mounted displays (OHMDs)), an embedded computing device (e.g., in communication with a smart textile or electronic fabric), and any other type of computing device that may be configured to store data and software instructions, execute software instructions to perform operations, and/or display information on an interface module, consistent with disclosed embodiments. In some instances, user 101 may operate client device 102 and may do so to cause client device 102 to perform one or more operations consistent with the disclosed embodiments. Similarly, in some instances, third party 151 may operate third-party device 152 and may do so to cause third-party device 152 to perform one or more operations consistent with the disclosed embodiments Referring back to FIG. 1, transaction system 130 may represent a computing system that includes one or more servers 160 and tangible, non-transitory memory devices storing executable code and application modules. Further, each of servers 160 may include one or more processors or processor-based computing devices, which may be configured to execute portions of the stored code or application modules to perform operations consistent with the disclosed embodiments. Further, although not illustrated in FIG. 1, transaction system 130 may also include a communications unit, such as a transceiver device, coupled to the one or more processors or processor-based computing devices, that exchange data across network 120 using any of the communications protocols described herein.

In some instances, transaction system 130 can be incorporated into a single computing system, although in other instances, transaction system 130 can be incorporated into multiple computing systems. For example, transaction system 130 may correspond to a distributed system that includes computing components distributed across one or more networks, such as communications network 120, or other networks, such as those provided or maintained by cloud-service providers (e.g., Amazon Cloud™, Google Cloud™, Microsoft Azure™, etc.). In other examples, also described herein, the distributed computing components of transaction system 130 may collectively perform additional, or alternate, operations that establish an artificial neural network capable of, among other things, adaptively and dynamically processing portions of input data to detect the occurrence of an event triggering an augmentation of an existing chat session, e.g., to include one or more third parties. The disclosed embodiments are, however, not limited to these exemplary distributed systems, and in other instances, transaction system 130 may include computing components disposed within any additional or alternate number or type of computing systems or across any appropriate network.

By way of example, transaction system 130 may be associated with, or may be operated by, a financial institution that provides financial services to customers, such as, but not limited to, user 101 and third party 151, and the financial institution may provide financial services to these customers that include, but are not limited to, an initiation and execution of one or more banking transactions (e.g., a fund transfer transaction, a peer-to-peer payment transaction, a digital bill-payment transaction, etc.) or one or more purchase transactions (e.g., involving digital or physical retailers). Further, and as described herein, transaction system 130 may also be configured to provision one or more executable application programs to network-connected devices operated by these customers, such as, but not limited to, executable banking application 108 provisioned to client device 102 (and, similarly, an executable payment application to third-party device 152).

To facilitate a performance of these and other exemplary processes, such as those described herein, transaction system 130 may maintain one or more databases within one or more tangible, non-transitory memories. For example, customer database 132 may include data records that identify and characterize one or more users of transaction system 130, e.g., user 101. For example, and for each of the users, the data records of customer database 132 may include a corresponding user identifier (e.g., an alphanumeric login credential assigned to user 101 by transaction system 130), and data that uniquely identifies one or more devices (such as client device 102 or third-party device 152) associated with or operated by that user (e.g., a unique device identifier, such as an IP address, a MAC address, a mobile telephone number, etc., that identifies client device 102 or third-party device 152).

Further, the data records of customer database 132 may also link each user identifier (and in some instances, the corresponding unique device identifier) to one or more elements of profile information that characterize corresponding ones of the users of transaction system 130, e.g., user 101 and third party 151. By way of example, the elements of profile information that identify and characterize each of the users of transaction system 130 may include, but are not limited to, a full name of each of the users and contact information associated with each user, such as, but not limited to, a mailing address, a mobile number, or an email address. In other examples, the elements of profile data may also include values of one or more demographic characteristics exhibited by or associated with corresponding ones of the users, such as, but not limited to, an age, a gender, a profession, or a level of education characterizing each of the users of transaction system 130.

Chatbot session database 136 may include data records that identify and characterize one or more programmatic exchanges of data during chatbot sessions initiated by, or on behalf of, one or more users of transaction system 130. For instance, the data records of chatbot session database 136 may include session data related to one or more previous chatbot sessions established programmatically between an application program executed by client device 102 (e.g., banking application 108, as described herein) and transaction system 130. By way of example, and for a particular one of these previously established chatbot sessions, the data records of chatbot session database 136 may include data that, among other things, identifies a party that initiated or participated in that previously established chatbot session (e.g., a login credential associated with user 101, a device identifier of client device 102, a unique identifier of an executed application program, such as an application cryptogram, etc.), a time or date associated with the previously established chatbot session, or a duration of that established chatbot session.

In other instances, and for the particular one of these previously established chatbot sessions, the data records of chatbot session databases 136 may also include raw or processed information that identifies and characterizes the data exchanged programmatically between client device 102 (e.g., by executed banking application 108) and transaction system 130. By way of example, and as described herein, certain elements of the exchanged data may correspond to a request, by user 101, to initiate one or more exchanges of data based on a determined consent of one or more corresponding third parties, and the elements of exchanged data may identify discrete linguistic elements within these data exchanges (e.g., a word, a combination of morphemes, a single morpheme, etc.).

For example, the one or more data exchanges may include, or facilitate, a transfer of funds from an account held by user 101 (e.g., checking account, savings account, brokerage account, etc.) that requires a consent from third party 151 (e.g., a such as a joint holder of the account, etc.). The data records of chatbot session database 136 may specify, for that fund transfer, discrete linguistic elements that include, but are not limited to, an identifier of the account, a fund transfer amount, an identifier of a source account that funds the payment amount, an identifier of a destination account that receives the funds, a fund transfer date or time, a desired currency, or a third party. In other instances, the data records of chatbot session database may also include discrete linguistic elements that identify third party 151.

Event detection database 138 may include data records that identify and characterize one or more triggering events that, when detected by transaction system 130, trigger transaction system 130 to augment an existing chatbot session to include one or more third parties, e.g., third party 151. In some instances, the data records may identify one or more words such as "spouse," "partner," "friend," which identify the one or more third parties. In some instances, the data records of event detection database 138 can also identify consent data that associates a requested product or service, such as a modification to an investment portfolio, an acquisition of a line of credit, or an account fund transfer request from a particular account, with a consenting third party.

Transaction system 130 may also maintain, within the one or more tangible, non-transitory memories, one or more executable application programs 140, such as, but not limited to, a chatbot engine 142, a natural language processing (NLP) engine 144, an event detection engine 148, and a third-party chat request engine 149. When executed by transaction system 130 (e.g., by the one or more processors of transaction system 130), chatbot engine 142 can perform operations that establish an interactive chatbot session with an application program executed by a network-connected device, such as client device 102 or third-party device 152. For example, chatbot engine 142 may perform, either alone or in combination with NLP engine 144, any of the exemplary processes described herein to process message data received from client device 102 (e.g., based on input provided to a digital interface generated and presented by client device 102) or third-party device 152, to adaptively and dynamically parse the message data to establish a meaning and/or a context of the message data and further, and to generate and provision, to a digital interface, a response to the message data via a secure, programmatic interface.

In some instances, when presented to user 101 on the digital interface (e.g., via display unit 116A of client device 102), the presented response may simulate an ongoing and contextually relevant dialog between user 101 and an artificially and programmatically generated chatbot. Further, when executed by transaction system 130, chatbot engine 142 can perform any of the exemplary processes described herein to augment an existing chatbot session to include one or more third parties (e.g., third party 151) in accordance with one or more received, obtained, or dynamically determined linguistic elements, such as one or more discrete linguistic elements identified by executed NLP engine 144.

Further, and when executed by transaction system 130, NLP engine 144 may apply one or more natural language processing algorithms to portions of received message data. Based on the application of these adaptive, statistical, or dynamic natural language processing algorithms, NLP engine 144 may parse the received message data to identify one or more discrete linguistic elements (e.g., a word, a combination of morphemes, a single morpheme, etc.), and to generate contextual information that establishes the meaning or a context of one or more discrete linguistic elements.

Examples of these natural language processing algorithms may include one or more machine learning processes, such as, but not limited to, a clustering algorithm or unsupervised learning algorithm (e.g., a k-means algorithm, a mixture model, a hierarchical clustering algorithm, etc.), a semi-supervised learning algorithm, or a decision-tree algorithm. In other examples, the one or more natural language processing algorithms may also include one or more artificial intelligence models, such as, but not limited to, an artificial neural network model, a recurrent neural network model, a Bayesian network model, or a Markov model. Further, the one or more natural language processing algorithms may also include one or more statistical processes, such as those that make probabilistic decisions based on attaching real-valued weights to elements of certain input data.

Certain of these exemplary statistical processes, machine learning processes, or artificial intelligence models can be trained against, and adaptively improved using, training data having a specified composition, which may be extracted from portions of customer database 132, transaction database 134, and/or a chatbot session database 136, and can be deemed successfully trained and ready for deployment when a model accuracy (e.g., as established based on a comparison with the outcome data) exceeds a threshold value. Further, although chatbot engine 142 and NLP engine 144 are distinctly shown in FIG. 1, in some examples, the functions of NLP engine 144 may be performed by chatbot engine 142 (e.g., NLP engine 144 is part or component of chatbot engine 142).

As described herein, executed event detection engine 148 may perform operations that detect an occurrence of an event in an existing chatbot session. Examples of these detected events may include, but are not limited to, an explicit request by the user to add the one or more third parties to the chatbot session, or a determination that a provisioning of a requested service, product, or operations is based on, is associated with, or requires the consent of the one or more third parties. Additionally, executed event detection engine 148 may perform operations that identify each of the one or more third parties, and further, that identify a third-party device (e.g., third-party device 152) operated by each of the third parties (e.g., third-party 152), such as a unique network address. In some instances, the detection of an occurrence of an event triggers the augmentation of an existing chat session, such as an existing chatbot session established with client device 102, to include one or more third-party devices, such as third-party device 152.

II. Exemplary Computer-Implemented Processes for Augmenting Established Chatbot Sessions to Include Third Parties In some embodiments, a network-connected device, such as client device 102, may perform operations that, upon execution of one or more locally maintained application programs (e.g., executed banking application 108), initiate an exchange of data with one or more network-connected devices or systems operating within environment 100, such as, but not limited to, transaction system 130. By way of example, the initiated data exchange may facilitate an establishment a chatbot session between executed banking application 108 and an additional application program, e.g., a chatbot engine, executed by transaction system 130, and executed banking application 108 may perform operations that generate and present a corresponding digital interface, e.g., a chatbot interface, to user 101 via display unit 116A.

As described herein, user 101 may provide input to discrete interface elements displayed within the chatbot interface (e.g., via input unit 116B), executed banking application 108 may package all, or a portion of, the received input into corresponding elements of chatbot session data for transmission to transaction system 130, which may perform operations, such as, but not limited to, initiated and executing certain banking transactions, in accordance with the session data. Examples of these banking transactions include, but are not limited to, account fund transfer transactions that transfer funds between accounts held by user 101 and/or third party 151, peer-to-peer (P2P) transactions that transfer funds between an account held by user 101 and one or more counterparties, and digital bill-payment transactions involving a payment of outstanding invoices or obligations.

The established chatbot session may, in some instances, represent an interactive chat session with a chatbot programmatic session generated by the chatbot engine executed by transaction system 130, and the elements of chatbot session data may include information that specifies a particular inquiry for resolution during the programmatically generated and maintained chatbot session. In some examples, transaction system 130 may receive the elements of chatbot session data that characterize the particular inquiry, e.g., a request to initiate any of the exemplary banking transactions described herein. Based on an application of one or more natural language processing algorithms to the received chatbot session data, transaction system 130 may perform operations that detect an occurrence of an event that triggers an augmentation of the existing chatbot session (e.g., between user 101 and the programmatically generated chatbot) to include one or more third parties, such as third party 151. Examples of these triggering events include, but are not limited to, an explicit request by user 101 to add the one or more third parties (e.g., third party 151) to the chatbot session, or a determination of a consent of the one or more third parties is necessary to perform a requested service, product, or operation.

In response to the detection of the triggering event, transaction system 130 may perform operations that determine an identifier of each of the one or more third parties (e.g., a third-party identifier of third party 151), and further, that determine an identifier of a third-party device associated with each of the one or more third parties (e.g., a device identifier of third-party device 102, such as a unique network address). In some instances, the user and each of the third parties can represent registered customers of the transaction system 130, which provisions the executable application program, e.g., banking application 108, to the user device 102 and to each of the third-party devices 152.

In some examples, transaction system 130 may perform operations that generate, populate, and locally store provisioning data that, when processes by application programs executed by each of the third-party devices, provisions the existing chatbot session (e.g., between user 101 and the programmatically generated chatbot) to corresponding chatbot interfaces generated by the each of the executed application programs. Further, transaction system 130 may generate a device-specific notification that includes a pointer to the locally stored provisioning data, and can transmit the device-specific notification to the network address of each of the third-party devices 152. For example, the notification may include a "deep link" to the locally stored provisioning data, which corresponds to data populating the chatbot interface presented by client device 102.

When received by third-party device 152, the device-specific notification triggers an execution of an additional application program (if not already executing in the background), such as an additional one of banking application 108, and prompts third party 151 to join the existing chatbot session by providing authentication credentials to the executed application program. In response to a successful authentication, the executed additional application program can request, and receive, from transaction system 130 portions of the provisioning data locally maintained by transaction system 130 and associated with the pointer. The executed application program can also generate an additional chatbot interface that allows third party 151 to participate in the existing chatbot session between user 101 and the programmatically generated chatbot, e.g., the participate in an "augmented" chatbot session. Further, and in response to the authentication and the provisioning of the additional chatbot interface at third-party device 152, transaction system 130 may provide additional data to client device 102 that augments the chatbot interface at client device 102 to reflect the participation of third party 151.

In some instances, and upon receipt of session data requesting a performance of certain operations based on a consent or approval of third parties unrelated to the existing chatbot session, many conventional chatbot systems and processes rely on delayed approval or confirmation messages transmitted by third-party systems or devices through out-of-session communications channels, and additionally, or alternatively, on an unverified attestation of a participating user that these third parties granted the necessary approval or consent. As described herein, however, these conventional chatbot systems and processes may lack any functionality that augment an existing chatbot session with a participating user, e.g., through a corresponding chatbot interface on a user device, to include an additional third-party interacting with the existing chatbot session in real-time through an additional and cryptographically secure chatbot interface generated and presented by a third-party device.

Through one or more of the exemplary embodiments described herein, a network-connected computing system, such as transaction system 130, may perform operations that monitor, in real-time, an interaction of user 101 with a corresponding chatbot interface generated by executed banking application 108, e.g., based on data exchanged with executed banking application 108 across a secure, programmatic interface during an existing chatbot session. For example, transaction system 130 may receive message data from client device 102 (e.g., provided by user 101 as input, via input unit 116B, to the chatbot interface), and based on an application of any of the natural language processing algorithms described herein, transaction system 130 may detect an occurrence of an event that triggers an augmentation of that existing chatbot session to include one or more third parties, such as third party 152 operating third-party device 152.

Further, and based on an application of one or more deterministic or stochastic statistical processes, machine learning processes, artificial intelligence models, or other adaptive processes to portions of the received message data and to elements of locally maintained customer profile, transaction, and chatbot session data, transaction system 130 may detect the occurrence of the triggering event and perform any of the exemplary processes described here to augment the existing chat session to include one or more third parties. For example, as described herein, transaction system 130 may obtain, from chatbot session database 136, data that identifies and characterizes a current "state" of the existing chatbot session, e.g., as displayed within the chatbot interface at client device 102, and store the data within a locally accessible data repository. In some instances, transaction system 130 can generate a deep link to that locally maintained data, and can generate a transmit a notification that includes the generated deep link to the network address of third-party device 152.

In some instances, the additional application program executed at third-party device 152 may process the notification, and may prompt third party 152 to provide one or more authentication credentials as inputs to the executed additional application program, e.g., via a corresponding input unit. Based on a successful authentication third party 152, e.g., using on the one or more authentication credentials, the executed additional application program may access the deep link (or other pointer data included within the notification), and third-party device 152 may perform additional operations that, in conjunction with transaction system 130, obtain portions of the locally maintained data that identifies and characterizes the current "state" of the existing chatbot session, and render the obtained portions of the locally maintained data for presentation to third party 152 via the additional chatbot interface.

Certain of the exemplary processes described herein, which couple the messaging functionality of a chatbot with processes that detect an occurrence of an event triggering an augmentation of the existing chat session to include one or more third parties, can be implemented in addition to, or an as an alternate to, one or more of the conventional chatbot systems and processes. Through these exemplary augmentation processes, a network-connected computing system, such as transaction system 130, obtains an approval or a consent of third party 151 to a performance of one or more user-requested operations in real time and through a cryptographically secure chatbot interface presented at third-party device 152.

In some examples, to initiate a chatbot session with transaction system 130 (e.g., the "existing" chatbot session described herein), user 101 may provide input to client device 102 (e.g., via input unit 116B) that requests an execution of a corresponding application program, such as banking application 108 of FIG. 1. For example, upon execution by client device 102, banking application 108 may generate and render one or more interface elements for presentation within a corresponding digital banking interface, such as through display unit 116A. In some examples, the digital banking interface may include interface elements that prompt user 101 to provide, via input unit 116B, input that specifies one or more authentication credentials (e.g., an alphanumeric login credential, an alphanumeric password, a biometric credential, etc.).

Based on the authentication credentials, executed banking application 108 may perform operations that authenticate an identity of user 101 based on copies of locally stored login and authentication credentials (e.g., as maintained within corresponding portions of device data 112 and application data 114) or based on data exchanged with one or more network-connected computing systems, such as transaction system 130. Further, and in response to a successful authentication of the identity of user 101, executed banking application 108 may perform operations that package a unique identifier of user 101 (e.g., one of the authentication credentials), and a unique identifier of client device 102 (e.g., an IP or MAC address extracted from device data 112) into corresponding portions of a request to initiate a chatbot session with transaction system 130. In some instances, executed banking application 108 may also package data confirming a successful authentication of the identity of user 101, such as an application cryptogram (e.g., extracted from, or generated in accordance with data maintained in, application data 114) into an additional portion of the request.

Client device 102 may transmit the generated request across network 120 to transaction system 130, e.g., via a secure programmatic interface. The secure programmatic interface may receive the generated request, and may relay the generated request to chatbot engine 142 of transaction system 130, which may perform operations that parse the request and extract the user identifier and the device identifier (and in some instances, the data confirming the successful authentication of the identity of user 101). In some instances, chatbot engine 142 may process the extracted data (e.g., the user identifier, the device identifier, and/or the confirmation data), and verify an authenticity or an integrity of the received request based on the device identifier or the confirmation data. Based on the verified authenticity or integrity, chatbot engine 142 may perform operations that initiate a chatbot session with executed banking application 108, and that generate an additional data record within chatbot session database 136 that identifies and characterizes the initiated chatbot session.

By way of example, the newly generated data record may include the user identifier and the device identifier (and in some instances, the confirmation data), and may further include a time or date at which chatbot engine 142 initiated the chatbot session. Further, in some instances, chatbot engine 142 may perform operations that generate an initial, introductory message for the chatbot session based on, among other things, one or more predetermined rules that specify appropriate introductory messages, the time or date of initiation, and additionally, or alternatively, the user or device identifiers. For example, the introductory message may include textual content that includes a greeting and that prompts user 101 to further interact with the established chatbot session (e.g., "Good morning! How can we help you?"), and chatbot engine 142 may perform operations that generate introductory message data specifying the introductory message, and that transmit the introductory message data across network 120 to client device 102, e.g., through a secure programmatic interface. Chatbot engine 142 may also perform operations that store the introductory message data within the newly generated data record that identifies the chatbot session within chatbot session database 136, and that associate the message data with the user identifier, the device identifier, and additionally, or alternatively, the confirmation data.

In some instances, client device 102 may receive the message data via the secure programmatic interface, which may route the introductory message data to executed banking application 108. In response to the receipt of the introductory message data, executed payment application may generate and render for presentation an additional digital interface, e.g., a chatbot interface, that includes the introductory message data and facilitates an ongoing and simulated conversation between user 101 and a programmatically generated chatbot maintained by transaction system 130, as described below in FIG. 2A.

Figure 2A:
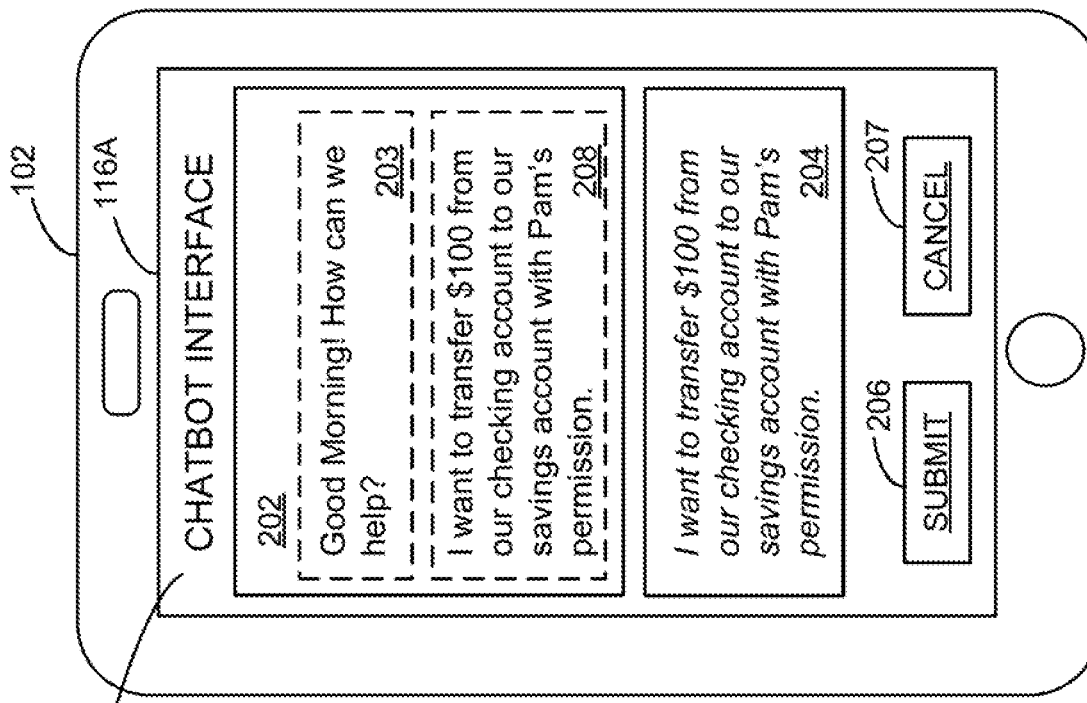
FIGS. 2A and 2B are diagrams illustrating portions of an exemplary graphical user interface, in accordance with some embodiments.
Figure 2B:
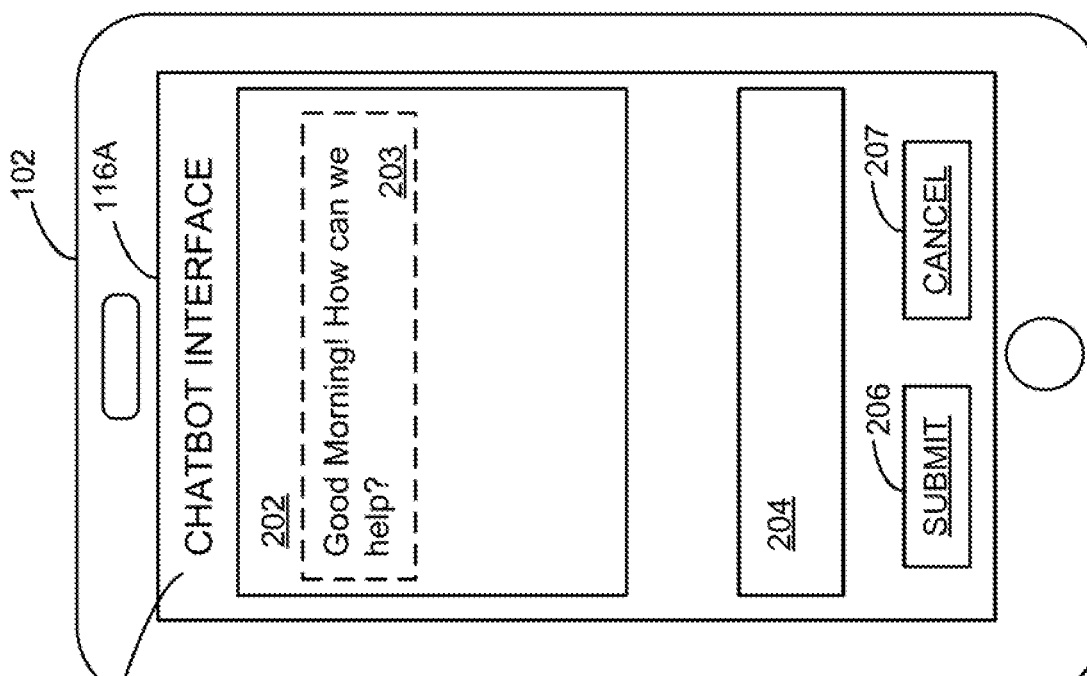

Referring to FIGS. 2A and 2B, client device 102 may present chatbot interface 200 on a corresponding portion of display unit 116A. In some instances, chatbot interface 200 may include a chatbot session area 202, which displays a summary of a current chatbot session, and fillable text box 204 allows user 101 to provide input that, after selection of interface element 206 (e.g., via input unit 116B), will be shown in chatbot session area 202. In some instances, executed banking application 108 may perform operations that present all or a portion of the introductory message data for presentation within chatbot interface 200, and as illustrated in FIG. 2A, chatbot session area 202 may include introductory message 203 (e.g., "Good Morning! How can we help?"). The automatic presentation of introductory message 203 may simulate a conversation between user 101 and the programmatic chatbot maintained by transaction system 130, and as illustrated in FIG. 2A, introductory message greet user 101 and prompts user 101 to further interact with the established chatbot session.

In some instances, user 101 may plan to initiate an exchange of data with transaction system 130 that facilitates an initiation of banking transaction, e.g., the transfer of money from one account to another. To initiate the data exchange (and the P2P transaction), user 101 may provide additional input to fillable text box of chatbot interface 200, e.g., via input unit 116B of client device 102, that requests an initiation of the data exchange and the banking transaction. For example, display unit 116A may correspond to a pressure-sensitive, touchscreen display unit, and user 101 may provide input to fillable text box 204, e.g., via a miniaturized "virtual" keyboard presented within digital chatbot interface 200.

In other instances, the input to fillable text box 204 may include audio content representative of a spoken utterance, which may be captured by a corresponding microphone embedded into client device 102 (e.g., as a portion of input unit 116B) or in communication with client device 102 (e.g., across a short-range communications channel, such as Bluetooth™, etc.). Executed banking application 108 may receive the audio content and, based on an application of one or more speech recognition algorithms or natural-language processes algorithms to the audio content, convert the audio content into text that may be displayed in fillable text box 204.

Referring to FIG. 2B, the message provided to fillable text box 204 may specify the request for the banking transaction, e.g., "I want to transfer $100 from our checking account to our savings account with Pam's permission." Further, user 101 may provide additional input to client device 102 that requests a submission of the message within fillable text box 204 to the established chatbot session by selecting "Submit" interface element 206 (e.g., by establishing contact between a portion of a finger or a stylus and a corresponding portion of a surface of display unit 116A that corresponding to interface element 206, or by uttering one or more predetermined phrases associated with interface element 206, which may be captured by any of the exemplary microphones described herein). Executed banking application 108 may detect the provided additional input, which requests the submission of the message within fillable text box 204 to the established chatbot session, and may perform operations that present all or a portion of the message within fillable text box 204 within chatbot session area 202 as message 208, e.g., "I want to transfer $100 from our checking account to our savings account with Pam's permission." In other instances, user 101 may provide input to input unit 116B that selects "Cancel" icon 207, the detection of which causes executed banking application 108 to clear any text currently in fillable text box 204 and prevent a submission of the message within fillable text box 204.

In response to the additional user input that selects "Submit" interface element 206, executed banking application 108 may perform operations that package all or a portion of message 208 into corresponding portions of session data, along with the unique identifier of user 101 (e.g., the alphanumeric login credential) and additionally, or alternatively, the unique device identifier (e.g., the IP or MAC address of client device 102 maintained within device data 112). Further, and as described herein, executed banking application 108 may also include, within a portion of the session data, an application cryptogram that identifies executed banking application 108, e.g., as extracted from application data 114.

Executed banking application 108 may perform operations that cause client device 102 to transmit all or a portion of the generated session data across network 120 to transaction system 130, e.g., using any appropriate communications protocol. In some examples, transaction system 130 may perform any of the exemplary processes described herein to detect, within the session data, an occurrence of an event triggering an augmentation of the chatbot session to include third party 151 (e.g., "Pam" in this example), to obtain an identifier of third party 151 and determine a unique network address of a network-connected device operated by third party 151 (e.g., third-party device 152), and to provision, to the network address of third-party device 152, a deep-link to a pre-populated chatbot interface (e.g., a web page, a screen of a digital interface, etc.) that facilitates the addition of the third party to the established chatbot session with client device 102 and the establishment of the augmented chatbot session.

Figure 3A:
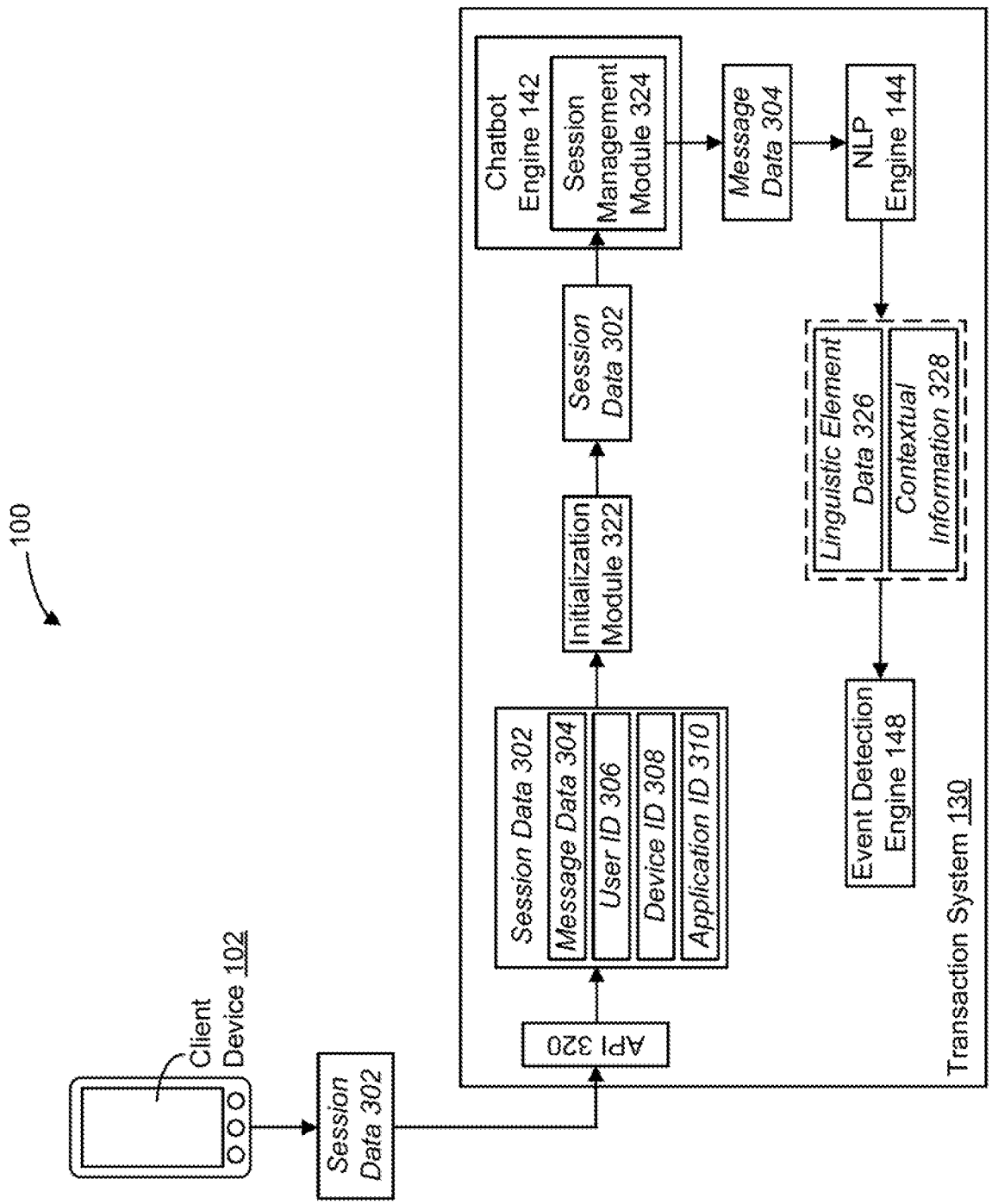
FIGS. 3A, 3B, and 3C are diagrams illustrating portions of an exemplary computing environment, in accordance with some embodiments.

Referring to FIG. 3A, a secure programmatic interface of transaction system 130, e.g., application programming interface (API) 320, may receive and route session data 302 to an initialization module 322 executed by transaction system 130. In some instances, and as described herein, session data 302 may include message data 304, which represents message 208 provided by user 101 as an input to chatbot interface 200 of FIG. 2B (e.g., "I want to transfer $100 from our checking account to our savings account with Pam's permission"), along with an identifier 306 of user 101 (e.g., an alphanumeric login credential, etc.), and an identifier 308 of client device 102 (e.g., an IP or MAC address, etc.). Further, session data 302 may also include a unique identifier of executed banking application 108 (e.g., an application cryptogram) that, in some instances, may enable transaction system 130 to verify an authenticity or an integrity of session data 302.

In some instances, API 320 may be associated with or established by initialization module 322, and may facilitate secure, module-to-module communications across network 120 between initialization module 322 and client device 102 (e.g., via communications unit 118). Initialization module 322 may parse session data 302 to extract one or more of user identifier 306, device identifier 308, or application identifier 310, and may perform operations (not illustrated in FIG. 3A) that verify an authenticity or an integrity of session data 302. In response to successful verification, initialization module 322 may perform operations that store session data 302 within one or more tangible, non-transitory memories, and may that provide session data 302 as an input to chatbot engine 142. Chatbot engine 142, when executed by transaction system 130, can maintain a chatbot session with, for example, client device 102. In other examples (not illustrated in FIG. 3A), in response to an unsuccessful verification, initialization module 322 may perform operations that generate and transmit, across network 120 to client device 102, an error message indicative of the failed verification, and that discard session data 302.

Referring back to FIG. 3A, a session management module 324 of chatbot engine 142 may receive session data 302, and may parse session data 302 to extract message data 304 (e.g., representative of provided input "I want to transfer $100 from our checking account to our savings account with Pam's permission"). In some instances, session management module 324 may perform operations that generate a programmatic command that executes NLP engine 144, e.g., as provided through a corresponding programmatic interface, and that provides all or a portion of message data 304 as an input to executed NLP engine 144.

NLP engine 144 may receive message data 304, and may apply any of the exemplary natural language processing algorithms described herein to all or a portion of message data 304. Based on the application of these natural language processing algorithms, NLP engine 144 may identify one or more discrete linguistic elements (e.g., a word, a combination of morphemes, a single morpheme, etc.) within message data 304, and may establish a context and a meaning of combinations of the discrete linguistic elements, e.g., based on the identified discrete linguistic elements, relationships between these discrete linguistic elements, and relative positions of these discrete linguistic elements within message data 304. In some instances, NLP engine 144 may generate linguistic element data 326, which includes each discrete linguistic element, and contextual information 328, which specifies the established context or meaning of the combination of the discrete linguistic elements.

As described herein, examples of these natural language processing algorithms may include one or more machine learning processes, such as, but not limited to, a clustering algorithm or unsupervised learning algorithm (e.g., a k-means algorithm, a mixture model, a hierarchical clustering algorithm, etc.), a semi-supervised learning algorithm, or a decision-tree algorithm. In other examples, the one or more natural language processing algorithms may also include one or more artificial intelligence models, such as, but not limited to, an artificial neural network model, a recurrent neural network model, a Bayesian network model, or a Markov model. Further, the one or more natural language processing algorithms may also include one or more statistical processes, such as those that make probabilistic decisions based on attaching real-valued weights to elements of certain input data.

Further, and in some instances, message data 304 may be representative of message 208 provided by user 101 as an input to chatbot interface 200 of FIG. 2, e.g., "I want to transfer $100 from our checking account to our savings account with Pam's permission." Based on the application of the exemplary natural language processing algorithms described herein to message data 304, NLP engine 144 may parse message data 304 and extract discrete linguistic elements (e.g., discrete words) that include, but are not limited to, "I," "want," "to," "transfer," "$100," "from," "our," "checking," "account," "savings," "with," "Pam's," and "permission," each of which may be packaged into a corresponding portion of linguistic element data 326. Further, and based on any of these exemplary natural language processing algorithms described herein to the discrete linguistic elements, e.g., alone or in combination, NLP engine 144 may determine that message 208 corresponds to a request to initiate a banking transaction, and that message 208 specifies a third party (e.g., "Pam") to facilitate the banking transaction, and data characterizing the banking transaction (e.g., "transfer," "$100," "checking account," "savings account").

In some instances, NLP engine 144 may package data identifying a particular type of the data exchange (e.g., the account transfer transaction described herein) and data identifying values of parameters that characterize the data exchange, such as the portion of the counterparty identifier (e.g., "Pam") and the transaction amount (e.g., "$100"), into corresponding portions of contextual information 328. Further, NLP engine 144 may provide linguistic element data 326 and contextual information 328 as inputs to event detection engine 148 that, when executed by transaction system 130, performs any of the exemplary processes described herein to detect, based on contextual information 328, an occurrence of an event triggering an augmentation of the existing chatbot session with transaction system 130.

Figure 3B:
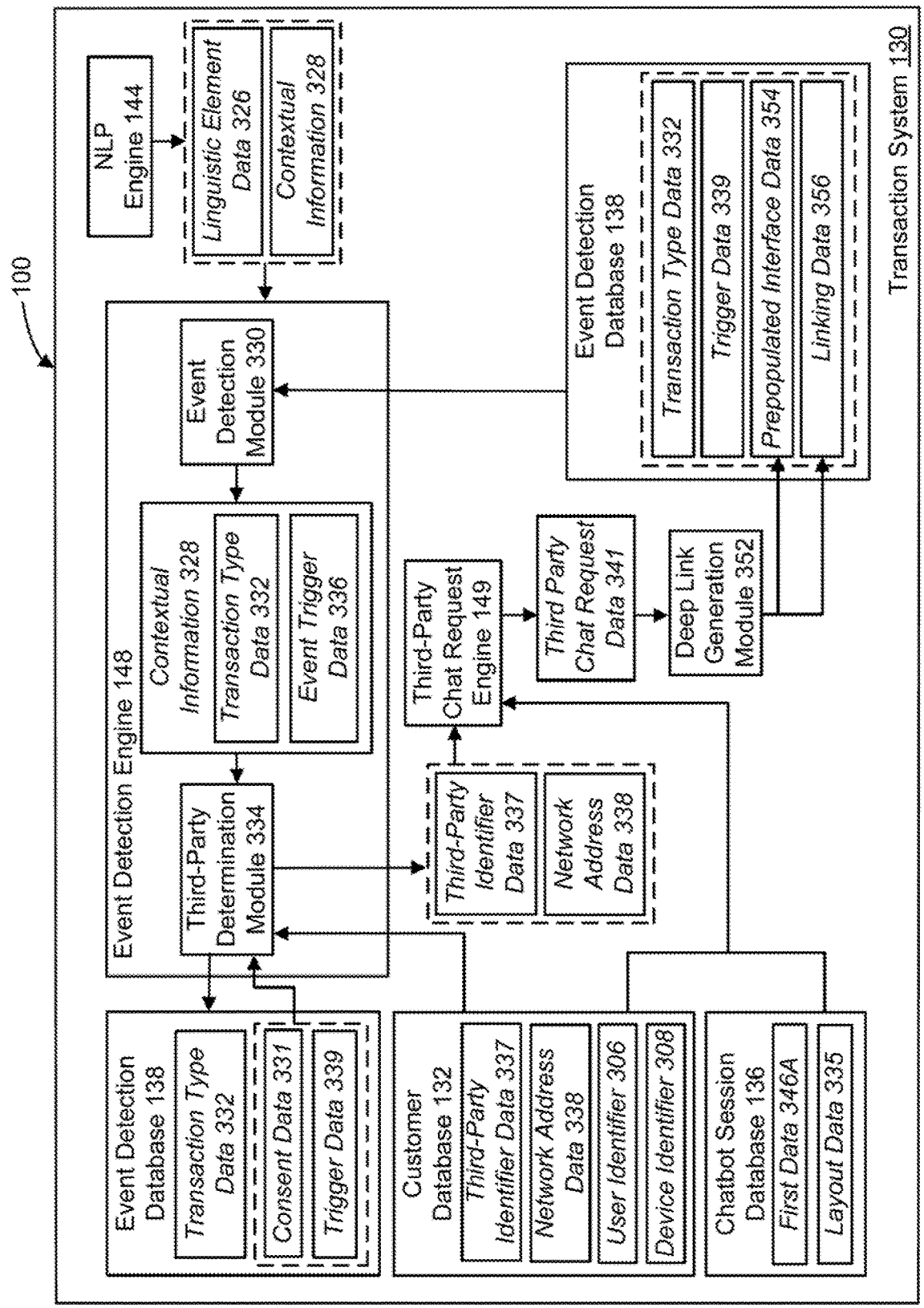

Referring to FIG. 3B, event detection engine 148 may receive and route linguistic element data 326 and contextual information 328 to an event detection module 330 of event detection engine 148. In some instances, event detection module 330 may perform operations that store linguistic element data 326 and contextual information 328 within corresponding portions of one or more tangible, non-transitory memories (not illustrated in FIG. 3B). Further, event detection module 330 may also parse contextual information 328 to identify a particular type of data exchange associated with message data 304 (e.g., a funds transfer transaction consistent with "I want to transfer $100 from our checking account to our savings account with Pam's permission") and to generate transaction type data 332 that specifies the particular type of data exchange.

Event detection module 330 may determine that transaction system 130 is capable of initiating or executing the particular type of data exchange, e.g., the banking transaction. Further, and based on the determination, event detection module 330 may detect the occurrence of the triggering event based on a comparison between portions of contextual data 328 and corresponding elements of trigger data 339 maintained within one or more tangible, non-transitory memories, e.g., within event detection database 138. Trigger data 339 may identify one or more specific events or specific types of events that, if detected within contextual data 328 (or message data 304), would trigger an augmentation of the existing chatbot session to include third party 151.

In some instances, trigger data 339 may specify that an explicit identification of third party 151 (e.g., by name) within message data 304 constitutes an occurrence of an event that triggers the augmentation of the existing chatbot session to include third party 151. For example, and based on a parsing of message data 304, event detection module 330 may establish that user 101 conditioned the initiation of the $100 funds transfer transaction on the permission of an explicitly identified third party, i.e., "Pam." Based on one or more accessed elements of triggering data 339, event detection module 330 may establish that the explicit identification of third party 151 (e.g., "Pam") constitutes an occurrence of an event that triggers the augmentation of the existing chatbot session to include third party 151. Further, event detection module 330 may generate one or more elements of event trigger data 336, which characterize the detected triggering event (e.g., the explicit identification of third party 151 by name) and include an identifier of third party 151 (e.g., "Pam").

In other examples, trigger data 339 may specify that an inclusion of one or more relationship identifiers in message data 304, e.g., in conjunction with a performance of a requested action, corresponds to a request for third-party consent or approval, and as such, also constitutes an occurrence of an event that triggers the augmentation of the existing chatbot session to include third party 151. The one or more relationship identifiers include, but are not limited to, "spouse," "partner," "wife," "husband," "child," "friend," and similar identifiers that convey a recognizable relationship between user 101 and third party 151. Further, and upon detection of a relationship identifier within contextual data 328, event detection module 330 may generate one or more elements of event trigger data 336 that identify the detected relationship identifier.

Further, in some examples, event detection module 330 may detect an occurrence of a triggering event based not on an explicit (e.g., by name) or implicit (e.g., by relationship identifier) identification of third party 151, but instead based on an association between the particular type of data exchange and third party 151. For instance, event detection module 330 may access consent data 331, e.g., as maintained within event detection database 138, and establish that one or more of elements of accessed consent data 331 identify or reference the particular type of data exchange and as such, that the particular type of data exchange relies on a consent or an approval of third party 151. Event detection module 330 may determine that the request of the particular type of data exchange by user 101, which relies on the consent or approval of third party 151, constitutes an occurrence of an event that triggers the augmentation of the existing chatbot session to include third party 151.

Event detection module 330 may extract information that identifies third party 151 from the one or more elements of consent data 331, and may generate one or more elements of event trigger data 336 that specify the reliance of the particular type of data exchange on the consent or approval of third party 151 and include the extract information that identifies third party 151. Further, event detection module 330 may perform any of the exemplary processes described herein to detect the occurrence of the triggering event based on an association between the particular type of data exchange and third party 151 in response to a determined absence of any explicit or implicit identification, or in addition to the explicit or implicit identification of third party 151.

If event detection module 330 fails to detect the occurrence of the triggering event, event detection module 330 may determine that an augmentation of the existing chatbot session is not required to perform the requested type of data exchange, and executed chatbot engine 142 may perform operations that initiate the requested type of data exchange in accordance with portions of message data 304 (not illustrated in FIG. 3B). Executed chatbot engine 142 may perform additional operations that generate programmatically a response to message 304 and transmit that response to client device 102 for presentation within chatbot interface 200 during the existing chatbot session (also not illustrated in FIG. 3B).

Alternatively, if event detection module 330 detects the occurrence of the triggering event, event detection module 330 may provide contextual information 328, transaction type data 332, and event trigger data 336 as an input to third-party determination module 334 of event detection engine 148. In some instances, and based on portions of event trigger data 336, third party determination module 334 may access customer database 132 and obtain an identifier 337 of third party 151 and a unique network address 338 of third-party device 152. By way of example, and as described herein, event trigger data 336 may explicitly identify third party 151 by name, e.g., "Pam," and third-party determination module 334 may compare the name of third party 151 against one or more records of customer database 132 to identify and extract third-party identifier 337.

For instance, and as described herein, the one or more records of customer database 132 may include profile data associated with user 101, which may specify that "Pam" represents a joint account holder on the checking account identified within message data 304. In some instances, third-party determination module 334 may access the profile data and obtain third-party identifier 337 of third party 151, i.e., "Pam," and may obtain network address 338 of third-party device 152 from one or more additional records of customer database 132 that are associated with, or reference, third-party identifier 337.

In other instances, third-party determination module 334 extract, from event trigger data 336 (or from a portion of contextual information 328, a relationship identifier (e.g., a "spouse") or a nickname for a third party. Third-party determination module 334 may access profile data locally maintained on behalf of the user (e.g., within customer database 132), and obtain third-party identifier 337, which may be associated with the relationship identifier or nickname (e.g., either alone or using additional portions of the customer database 132 that correlate third party names to the third party identifiers, such as consent data 331).

In some instances, third-party identifier 337 may correspond to an alphanumeric user name or login credential that uniquely identifies the third party and that facilitates the third party's access to transaction system 130. Further, examples of network address 338 include, but are not limited to, an IP address or a MAC address. As illustrated in FIG. 3B, third-party determination module 334 may provide third-party identifier 337 and network address 338 as inputs to a third-party chat request engine 149, which may perform any of the exemplary processes described herein to generate data characterizing a current "state" of existing chatbot session between user 101 and the programmatically generated chatbot.

In some instances, third-party chat request engine 149 may receive third-party identifier 337 and network identifier 338, and may extract user identifier 306 (which identifies user 101) and device identifier 308 (which identifies client device 102) from corresponding portions of session data 302, or from corresponding portions of customer database 132. Based on user identifier 306, third-party chat request engine 149 may also access chatbot session database 136, and obtain chatbot session data 346, which characterizes not only the currently existing chatbot session involving user 101, but also one or more prior chatbot sessions involving user 101. In some instances, and for a particular one of the existing or prior chatbot sessions involving user 101 and client device 102, chatbot session data 346A may include, but is not limited to, a unique session identifier (e.g., an alphanumerical character string having a specified format), data that identifies user 101 (e.g., user identifier 306), data that identifies client device 102 (e.g., device identifier 308, application identifier 310, etc.), a time or date associated with the chatbot session, a duration of that chatbot session, and/or a session log that includes raw or processed information that identifies and characterizes each of the messages exchanged programmatically between client device 102 (e.g., by executed banking application 108) and transaction system 130.

Third-party chat request engine 149 may also perform operations that, within the data records of chatbot session database 136, identify and obtain one or more elements of layout data 335 that characterize a digital interface, such as chatbot interface 200. In some instances, layout data 335 may include information that identifies one or more discrete interface elements disposed within the corresponding digital interface (e.g., of chatbot interface 200) and further, that that specifies a position of each of the discrete interface elements within the corresponding the digital interface, e.g., when rendered for presentation.

Based on portions of chatbot session data 346 that characterize the existing chatbot session, and based on portions of layout data 335, third-party chat request engine 149 may perform operations to generate and locally store populated interface data that provisions the existing chatbot session for user 101 to a chatbot interface generated and presented by the additional application program, such as the additional one of banking application 108, executed at third-party device 152. For example, the populated interface data may include chatbot session data that characterizes prior messages exchanged between user 101 and transaction system 130 during the existing chatbot session. In other instances, and consistent with the disclosed embodiments, third-party chat request engine 149 may obtain all or a portion of chatbot session data 346 or layout data 335 from one or more additional network-connected systems, e.g., across network 120 via secure programmatic interfaces. For instance, these additional network-connected systems may establish, or represent components of, a distributed network provided or maintained by any of the exemplary cloud-service providers described herein.

Referring back to FIG. 3B, third party chat request engine 149 may perform operations that package the populated interface data into corresponding elements of third-party chat request data 341. When executed by transaction system 130, third-party chat request engine 149 may provide third-party chat request data 341 as an input to a deep-link generation module 352 of transaction system 130. In some instances, deep-link generation module 352 may perform any of the exemplary processes described herein to generate information that pre-populates a digital chatbot interface, e.g., as presented at third-party device 152, with portions of chatbot session data 346 or layout data 335 that characterize the existing chatbot session (e.g., as included within third-party chat request data 341), and to generate linking data that establishes a deep link to the pre-populated digital interface.

Deep-link generation module 352 may receive third-party chat request data 341, which may include chatbot session data 346 that characterizes prior messages exchanged between the user 101 and transaction system 130 during the existing chatbot session, and may package third-party chat request data 341 into corresponding portions of prepopulated interface data 354, and perform operations that store pre-populated interface data 354 within a corresponding portion of event detection database 138 (not illustrated in FIG. 3B).

Further, deep-link generation module 352 may perform operations that generate a deep link to the locally maintained elements of pre-populated interface data 354. The generated deep link may identify pre-populated interface data 354, and may refer to or point to a storage location of pre-populated interface data 354, e.g., within event detection database 138. In some instances, deep-link generation module 352 may generate linking data 356 that identifies and characterizes the generated deep link, and may perform operations that stores linking data 356 within the data records of event detection database 138.

Figure 3C:
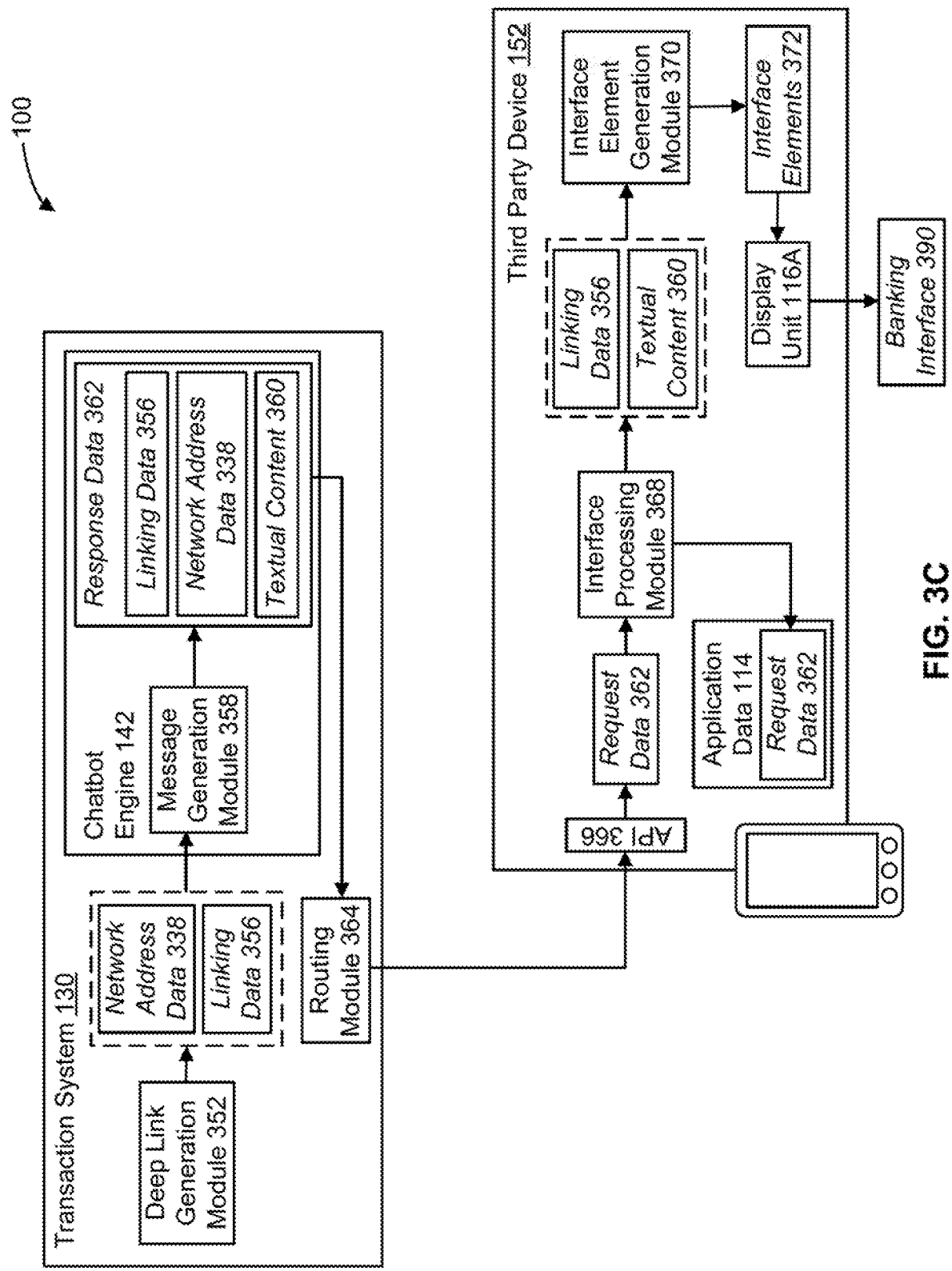

Referring to FIG. 3C, deep-link generation module 352 may provide linking data 356 and network address data 338, which identify a network address of third-party device 152, as an input to a message generation module 358 of chatbot engine 142, which may perform operations that, in response to message data 304 (e.g., representative of provided input "I want to transfer $100 from our checking account to our savings account with Pam's permission"), generates a notification to the third-party device 152. In some instances, message generation module 358 may programmatically generate textual content 360 that refers to message data 304, and may package textual content 360 and linking data 356 into corresponding portions of request data 362. Additionally, message generation module 358 may also package data associated with, or identifying, the established and ongoing chatbot session into request data 362, such as a session identifier or a cryptogram associated with chatbot engine 142.

Message generation module 358 may provide request data 362, which includes textual content 360 and linking data 356 (and in some instances, additional identifiers of the chatbot session or of transaction system 130), as an input to a routing module 364 executed by transaction system 130. Routing module 364 may also obtain network address data 338 identifying a network address of third-party device 152, and may perform operations that cause transaction system 130 to transmit response data 362 across network 120 to the obtained network address of third-party device 152. By way of example, and when rendered for presentation within a corresponding digital interface by executed banking application 108, textual content 360 may prompt third party 151 to provide additional input to third-party device 152 (e.g., via input unit 116B) to enter corresponding authentication credentials.

A secure programmatic interface of third-party device 152, e.g., application programming interface (API) 366, may receive request data 362 and provide it to an interface processing module 368 of banking application 108, e.g., as executed by third-party device 152. API 366 may be associated with or established by interface processing module 368, and may facilitate secure, module-to-module communications across communications network 120 between interface processing module 368 and chatbot engine 142 executed by transaction system 130, e.g., via routing module 364. In some instances, interface processing module 368 may perform operations that stores response data 362 within one or more tangible, non-transitory memories, such as application data 114. In some instances, the reception of request data 362 may cause third-party device 152 to execute banking application 108. In other instances, third-party device 152 may execute banking application 108 in the background, and the receipt of request data 362 may cause third-party device 152 to perform operations that promote executing banking application 108 to the foreground (e.g., the foreground of display unit 116A).

Based on portions of response data 362 (e.g., the information identifying the existing and ongoing chatbot session), interface processing module 368 may determine that request data 362 represents a request to join an existing chatbot session between another user (e.g., user 101), and the programmatically generated chatbot maintained by transaction system 130. In some instances, interface processing module 368 may parse response data 362 to extract linking data 356 and textual content 360, which may be provided as inputs to an interface element generation module 370 executed by third-party device 152. Interface element generation module 370 may perform operations that generate interface elements 372 that represent, and render for presentation, portions of linking data 356 and textual content 360. Further, interface element generation module 370 may route generated interface elements 372 to display unit 116A, which may present interface elements 372 within a corresponding portion of banking interface 390.

Referring to FIG. 3D, and when presented within message area 391 of banking interface 390, interface elements 372 may establish a new message 392 identifying the received request (e.g., via request data 362) and requesting that third party 151 provide login or authentication credentials to the third-party device 152 (e.g., via a corresponding input unit). As illustrated in FIG. 3D, banking interface 390 includes fillable text boxes 394 and 396 where user 152 may provide authentication credentials. Although fillable text boxes 394 and 396 indicate, in this example, a user identification (ID) and password, examples of the login and authentication credentials may also include, but are not limited to, an alphanumeric login credential, a unique digital identifier assigned to the user by the transaction system, an alphanumeric password, or a biometric credential, such as scanned fingerprint data or a facial image.

Upon selection of icon 397 (e.g., via input unit 116B), third-party device 152 may perform operations to authenticate an identity of the third party based on locally maintained login and authentication data, or based on information exchanged with transaction system 130 via a secure, programmatic interface (e.g., request data 362, or data previously exchanged during a provisioning of banking application 108 to third-party device 152). In other instances, third party 151 may provide input to input unit 1166 that selects "Cancel" icon 398, the detection of which causes executed banking application 108 to clear any text currently in fillable text box 394 and 396, and prevent third-party device 152 from authenticating third party 101.

In response to a successful authentication, executed banking application 108 requests an instantiation of an augmented chatbot session with transaction system 130, and requests the populated interface data linked to the pointer within the received notification (e.g., the deep link to the populated interface data, linking data 356). In some instances, upon a successful authentication, banking interface 390 may display a deep link (not shown) to the populated interface data (e.g., prepopulated interface data 354 maintained by transaction system 130) as identified by linking data 356. Upon selection of the deep link by third party 151 (e.g., by establishing contact between a finger or a stylus and a portion of a surface of a pressure-sensitive, touchscreen display unit that corresponds to the deep link), the executed banking application 108 requests an instantiation of an augmented chatbot session with transaction system 130, and requests the populated interface data linked to the pointer within the received notification (e.g., the deep link to the populated interface data, linking data 356).

Figure 4A:
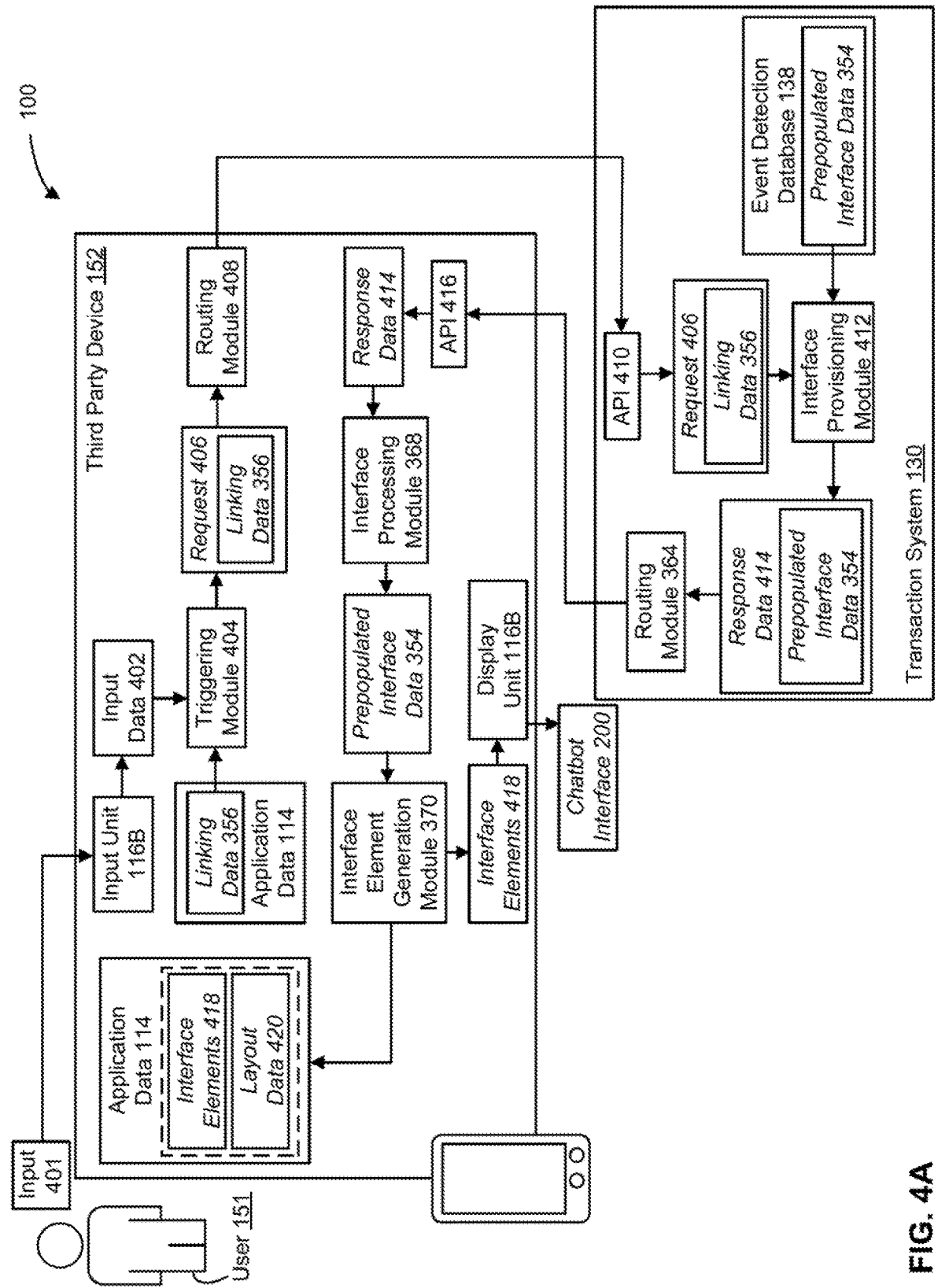
FIG. 4A is a diagram illustrating a portion of an exemplary computing environment, in accordance with some embodiments.

As illustrated in FIG. 4A, input unit 116B may receive input 401 from third party 151, and may route input data 402 that characterizes received input 401 to a triggering module 404 of banking application 108, e.g., as executed by third-party device 152. In some instances, input data 402 may identify one or more spatial positions of third party 151's established contact along the surface of the pressure-sensitive, touchscreen display unit, and may also identify a duration of that established content. Triggering module 404 may perform operations that establish that third party 151 selected a deep link corresponding to linking data 356 based on portions of generated interface elements 372 and on input data 402 (e.g., that the one or more contact positions correspond to a presented position of deep link within banking interface 390). In some instances, input data 402 may identify the selection of icon 397 which, if authentication of third party 151 was successful, automatically triggers the selection of the deep link.

In response to the determination that the deep link was selected, triggering module 404 may access locally maintained linking data 356 (e.g., within application data 114), and package all or a portion of linking data 356 into a corresponding portion of a request 406 for the pre-populated interface data associated with the deep link. In some instances, request 406 may also include the unique identifier of third party 151 (e.g., the alphanumeric login credential of third party 151), the unique device identifier of third-party device 152 (e.g., the IP or MAC address of third-party device 152) and additionally, or alternatively, the unique identifier of banking application 108 (e.g., the application-specific cryptogram described herein). Triggering module 404 may provide request 406 as an input to a routing module 408 executed by third-party device 152, which may perform operations that causes third-party device 152 to transmit request 406 across network 120 to a unique network address of transaction system 130.

A secure programmatic interface of transaction system 130, such as an application programming interface (API) 410, may receive and route request 406 to an interface provisioning module 412 of transaction system 130. API 366 may be associated with or established by interface provisioning module 412, and may facilitate secure, module-to-module communications across communications network 120 between interface provisioning module 412 and executed banking application 108, e.g., via routing module 408.

As described herein, request 406 may include at least a portion of linking data 356 and in some instances, may also include the unique identifier of third party 151 (e.g., the alphanumeric login credential of third party 151), the unique device identifier of third-party device 152 (e.g., the IP or MAC address of third-party device 152) and additionally, or alternatively, the unique identifier of banking application 108 (e.g., the application-specific cryptogram described herein). By way of example, interface provisioning module 412 may perform operations (not illustrated in FIG. 4A) that parse request 406 and extract the unique identifiers of third party 151, third-party device 152, or executed banking application 108, and perform operations that authenticate an identity of third party 151 or third-party device 152 (e.g., based on portions of the unique identifiers of third party 151 or third-party device 152) or verify an authenticity of request 406 (e.g., based on the unique identifier of executed banking application 108, such as an application cryptogram).

If interface provisioning module 412 were unable to authenticate the identity of third party 151 or third-party device 152, or to verify the authenticity of request 406, interface provisioning module 412 may generate an error message indicative of the failed authentication or verification, which transaction system 130 may transmit back across network 120 to third-party device 152. Further, interface provisioning module 412 may perform operations that discard received request 406, and await additional provisioning requests generated by third-party device 152.

In other instances, and in response to a successful authentication of the identity of third party 151 or third-party device 152, and/or a successful verification of the authenticity of request 406, interface provisioning module 412 may parse request 406 to extract all or a portion of linking data 356. Further, interface provisioning module 412 may perform operations that access the data records of event detection database 138, and identify and extract one or more elements of prepopulated interface data 354 associated with linking data 356 within the accessed data records. For example, and as described herein, prepopulated interface data 354 may include third party chat request data 341 that characterizes prior messages exchanged between user 101 and transaction system 130 during an existing chatbot session.

Interface provisioning module 412 may perform operations that package the extracted elements of prepopulated interface data 354 into corresponding portions of response data 414, which interface provisioning module 412 may provide as an input to routing module 364 executed by transaction system 130. In some instances, routing module 364 may obtain a unique network address of third-party device 152 (e.g., an IP address maintained within customer database 132), and perform operations that cause transaction system 130 to transmit response data 414 across network 120 to the unique network address of client device 102.

As illustrated in FIG. 4A, a secure programmatic interface of third-party device 152, e.g., application programming interface (API) 416, may receive and route response data 414 to interface processing module 368 of banking application 108, e.g., as executed by third-party device 152. API 416 may be associated with or established by interface processing module 368, and may facilitate secure, module-to-module communications across communications network 120 between interface processing module 368 and interface provisioning module 412 executed by transaction system 130, e.g., via routing module 364. In some instances, interface processing module 368 may perform operations that stores response data 414 within one or more tangible, non-transitory memories, such as application data 114 (not illustrated in FIG. 4A).

In some instances, interface processing module 368 may parse response data 414 to extract prepopulated interface data 354, and may provide prepopulated interface data 354 as an input to interface element generation module 370 (e.g., as executed by third-party device 152). Based on portions of prepopulated interface data 354, interface element generation module 370 may perform operations that generate populated interface elements 418, which may include, as described herein, corresponding elements or portions of prior messages exchanged between client device 102 and transaction system 130 during an existing chatbot session (e.g., third party chat request data 341). Interface element generation module 370 may also perform operations, based on portions of prepopulated interface data 354, that generate layout data 420, which specifies a size, position, or visual characteristic (e.g., color, etc.) of each of the populated interface elements when presented within chatbot interface 200 displayed on display unit 116A. Interface element generation module 370 may store populated interface elements 418 and layout data 420 within a tangible, non-transitory memory, e.g., within application data 114, and may route populated interface elements 418 and layout data 420 to display unit 116A, which may perform operations that present each of populated interface elements 418 within a digital interface, e.g., chatbot interface 400, in accordance with layout data 420.

Figure 4B:
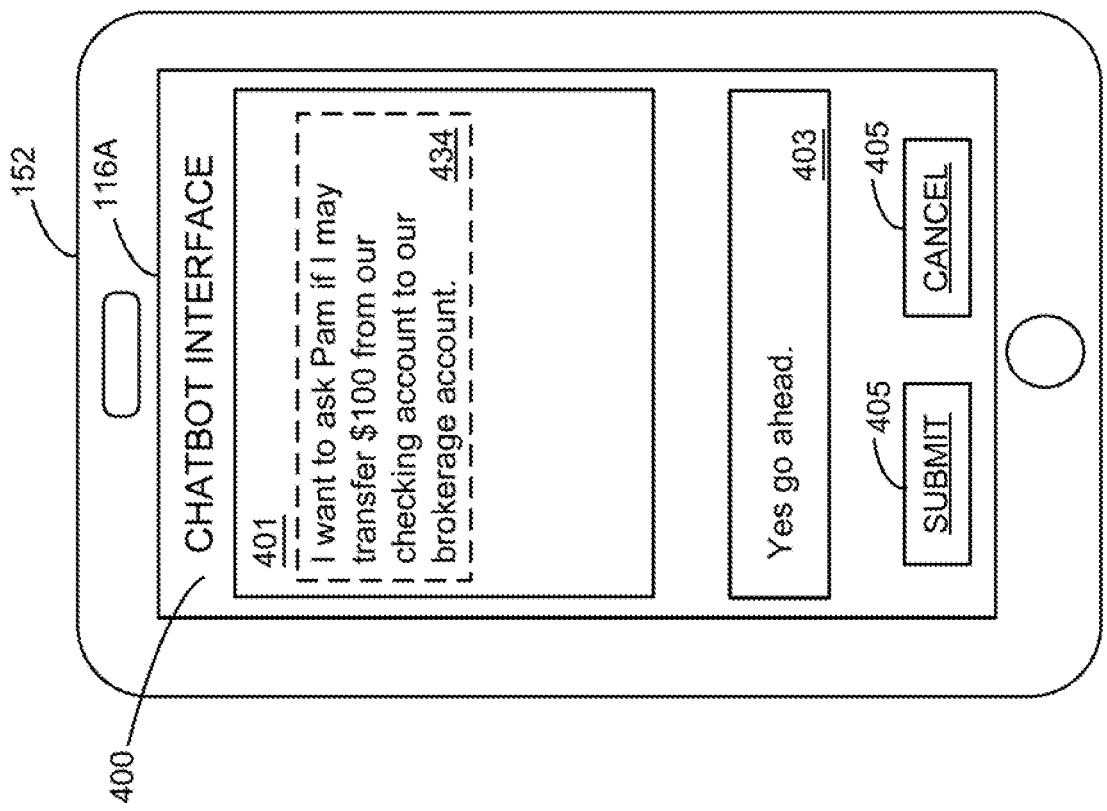
FIGS. 4B and 4C are diagrams illustrating portions of an exemplary graphical user interface, in accordance with some embodiments.

Referring to FIG. 4B, chatbot interface 400 includes chatbot session area 401 which includes message 434, e.g., "I want to transfer $100 from our checking account to our savings account with Pam's permission" generated by client device 02 during the existing chatbot session. Third party 151 may provide input to third-party device 152 in fillable text box 403 (e.g., via the corresponding input unit) that responds to message 434 and provides or device consent or approval of the requested transfer. Further, third party 151 may provide additional input to third-party device 152 that requests a submission of the message within fillable text box 403 to the newly augmented chatbot session by selecting the "Submit" icon 405 (e.g., by establishing contact between a portion of a finger or a stylus and a corresponding portion of a surface of display unit 116A that corresponding to icon 405, or by uttering one or more predetermined phrases associated with interface element 206, which may be captured by any of the exemplary microphones described herein).

Figure 4C:
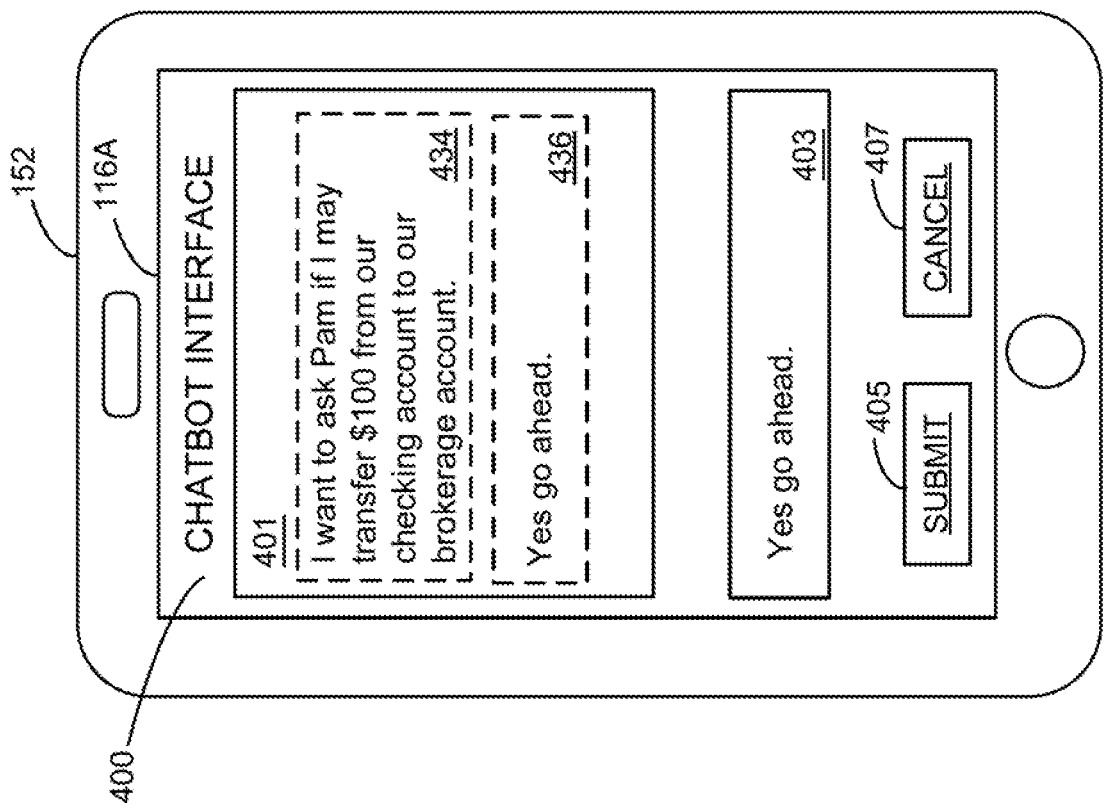

Executed banking application 108 may detect the provided additional input, which requests the submission of the message within fillable text box 403 to the augmented chatbot session, and may perform operations that present all or a portion of message 403 within chatbot session area 401, as illustrated in FIG. 4C in reference to message 436 (e.g., "Yes go ahead"). In other instances, third party 151 may provide input to input unit 1166 that selects "Cancel" icon 407, the detection of which causes executed banking application 108 to clear any text currently in fillable text box 204 and prevent a submission of the message within fillable text box 204 to the established chatbot session with client device 102.

In other examples, third party 151 may utter a particular spoken comment (e.g., an utterance of "initiate transaction," etc.), which may be captured by a microphone embedded into input unit 116B or communicative coupled to third-party device 152, and third-party device 102 may apply one or more speech recognition algorithms or natural language processing algorithms to the captured audio input to confirm the user's intention to generate or submit the message within fillable text box 403. The disclosed embodiments are not limited to these exemplary interface elements and in other examples, chatbot interface 400 may include any additional or alternate interface elements.

Figure 4D:
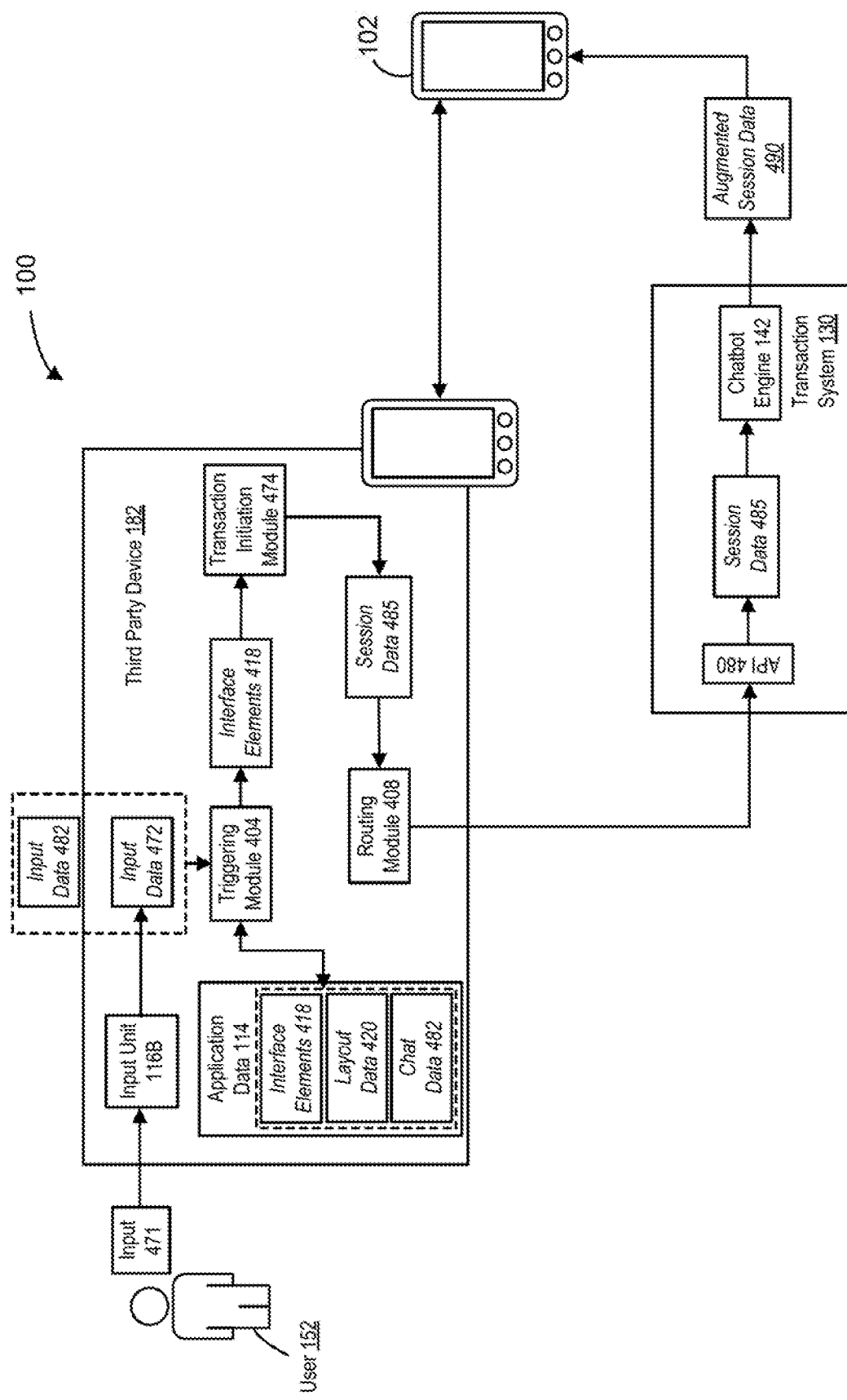
FIG. 4D is a diagram illustrating a portion of an exemplary computing environment, in accordance with some embodiments.

As illustrated in FIG. 4D, input unit 116B may receive input 471 from third party 151, which may be indicative of third party 151's selection of interface element 405 and third party 151's intention to submit message 436 to the augmented chatbot session with client device 102. Input unit 116B may route chat data 482 that characterizes message 436, and input data 472 that characterizes the selection of interface element 206, from received input 471 to triggering module 404 of banking application 108, e.g., as executed by third-party device 152. In some instances, input data 402 may identify one or more spatial positions of third party 151's established contact along the surface of the pressure-sensitive, touchscreen display unit, and may also identify a duration of that established content. Triggering module 404 may perform operations that establish that third party 151 selected interface element 206 based on input data 472.

In response to the determination that third party 151 selected interface element 206, triggering module 404 may obtain input data 472 (e.g., which includes the text entered in fillable text box 403), and provides input data 472 as an input to a transaction initiation module 474 of banking application 108, e.g., as executed by third-party device 152. Transaction initiation module 474 may perform operations that packages input data 472 into a corresponding portion of a session data 485. In some instances, session data 485 may also include the unique identifier of third party 151 (e.g., the alphanumeric authentication credential of third party 151), the unique device identifier of third-party device 152 (e.g., the IP or MAC address of third-party device 152) and additionally, or alternatively, the unique identifier of banking application 108 (e.g., the application-specific cryptogram described herein). Transaction initiation module 474 may provide session data 485 as an input to routing module 408 executed by third-party device 152, which may perform operations that causes third-party device 152 to transmit session data 485 across network 120 to the unique network address of transaction system 130.

A secure programmatic interface of transaction system 130, such as an application programming interface (API) 480, may receive and route session data 485 to executed chatbot engine 142. API 480 may be associated with or established by chatbot engine 142, and may facilitate secure, module-to-module communications across communications network 120 between chatbot engine 142 and executed banking application 108, e.g., via routing module 408.

In some examples, chatbot engine 142 may perform operations (not illustrated in FIG. 4D) that parse session data 485 and extract the unique identifiers of third party 151, third-party device 152, or executed banking application 108, and performs operations that authenticate an identity of third party 151 or third-party device 152 (e.g., based on portions of the unique identifiers of third party 151 or third-party device 152) or verify an authenticity of chat session data 485 (e.g., based on the unique identifier of executed banking application 108, such as an application cryptogram).

If chatbot engine 142 were unable to authenticate the identity of third party 151 or third-party device 152, or to verify the authenticity of session data 485, chatbot engine 142 may perform operations that discard received session data 485 and generate an error message indicative of the failed authentication or verification, which transaction system 130 may transmit back across network 120 to third-party device 152.

In other instances, and in response to a successful authentication of the identity of third party 151 or third-party device 152, and/or a successful verification of the authenticity of session data 485, chatbot engine 142 may generate a response message (not shown) to client device 102 acknowledging that a third party (e.g., third-party 151) has been authenticated and will be added to the existing chatbot session between client device 102 and transaction system 130. In some instances, transaction system stores all or a portion of session data 485 in corresponding records of chatbot session database 136.

Further, in some instances, chatbot engine 142 parses session data 485 to generate augmented session data 490 that may be provided in an existing chatbot session, such as an existing chatbot session with client device 102. For example, chatbot engine 142 may generate augmented session data 490 based on all or a portion of session data 485, and transmit augmented session data 490 to client device 102 within an existing chat session established with client device 102, thereby including third-party device 152 in the existing chat session with client device 102.

Figure 4E:
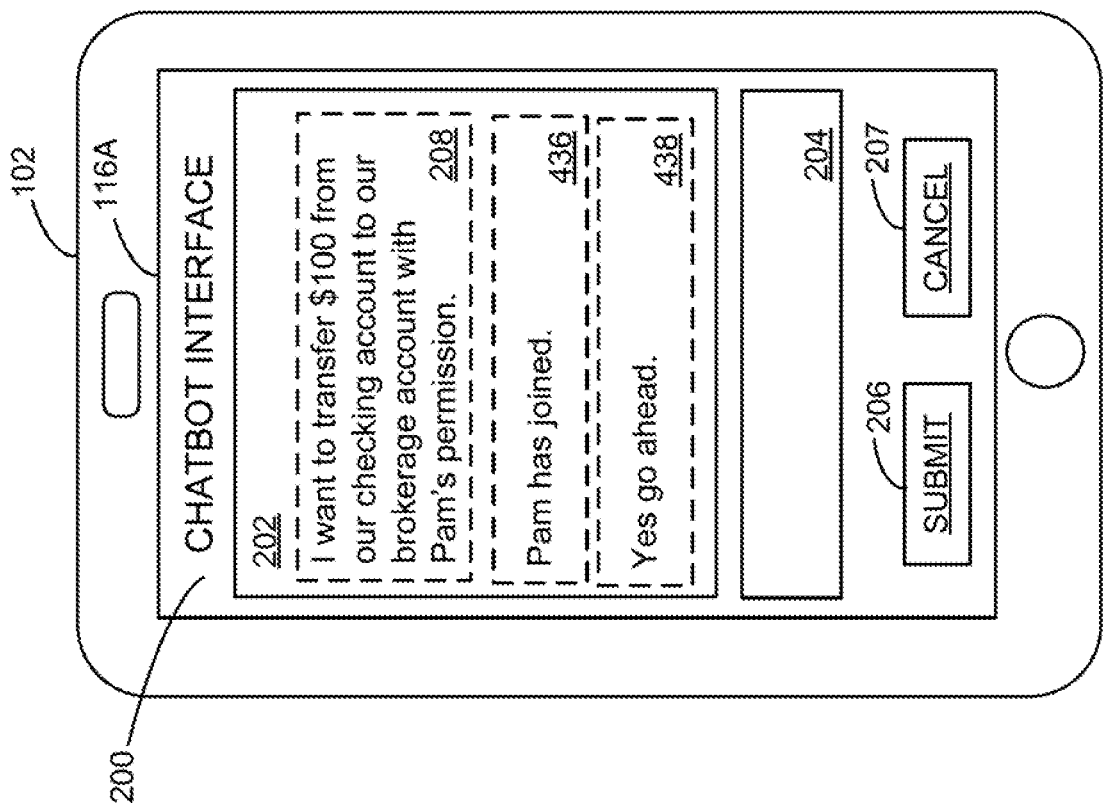
FIG. 4E is a diagram illustrating a portion of an exemplary graphical user interface, in accordance with some embodiments.

In some instances, client device 102 may receive augmented session data 490 through a corresponding programmatic interface (not illustrated in FIG. 1), and may generate one or more interface elements suitable for presentation within chatbot interface 200, e.g., during the newly augmented chatbot session between user 101, third party 151, and the programmatically generated chatbot. Referring to FIG. 4E, and as presented to user 101 by client device 102 (via display unit 116A), chatbot interface 200 displays chatbot session area 202, which includes message 208, e.g., "I want to transfer $100 from our checking account to our savings account with Pam's permission." Chatbot session area 202 also includes message 436, "Pam has joined," which may be a message transmitted by transaction system 130 within the existing chatbot session with client device 102. For example, message 436 may have been generated by chatbot engine 142 acknowledging that a third party (e.g., third-party device 152) has been authenticated and will be added to the existing chatbot session between client device 102 and transaction system 130. Chatbot session area 202 also includes message 436, "Yes go ahead," which may have been received as a portion of augmented session data 490.

Further, although not illustrated in FIGS. 4A-4E, transaction system 130 may also perform any of the exemplary processes described herein to parse session data 485 and generate additional contextual information that characterizes an intent and a meaning of message 436, which includes the consent of third party 151 to the requested funds transfer (e.g., "Yes go ahead"). For example, executed NLP engine 144 of transaction system 130 may apply any of the exemplary natural-language processing techniques described herein to portions of session data 485, which correspond to message 436, and generate additional elements of contextual data that confirm a consent and approval of third party 151 (e.g., "Pam") for the requested transfer of $100 from the checking to the savings account. Based on the provisioned approval and consent, as confirmed by the additional contextual data, transaction system 130 may perform operations that initiate and execute the requested transfer, and that update portions customer database 132 to reflect the debit of $100 in the checking account and the credit of $100 in the savings account.

Figure 5A:
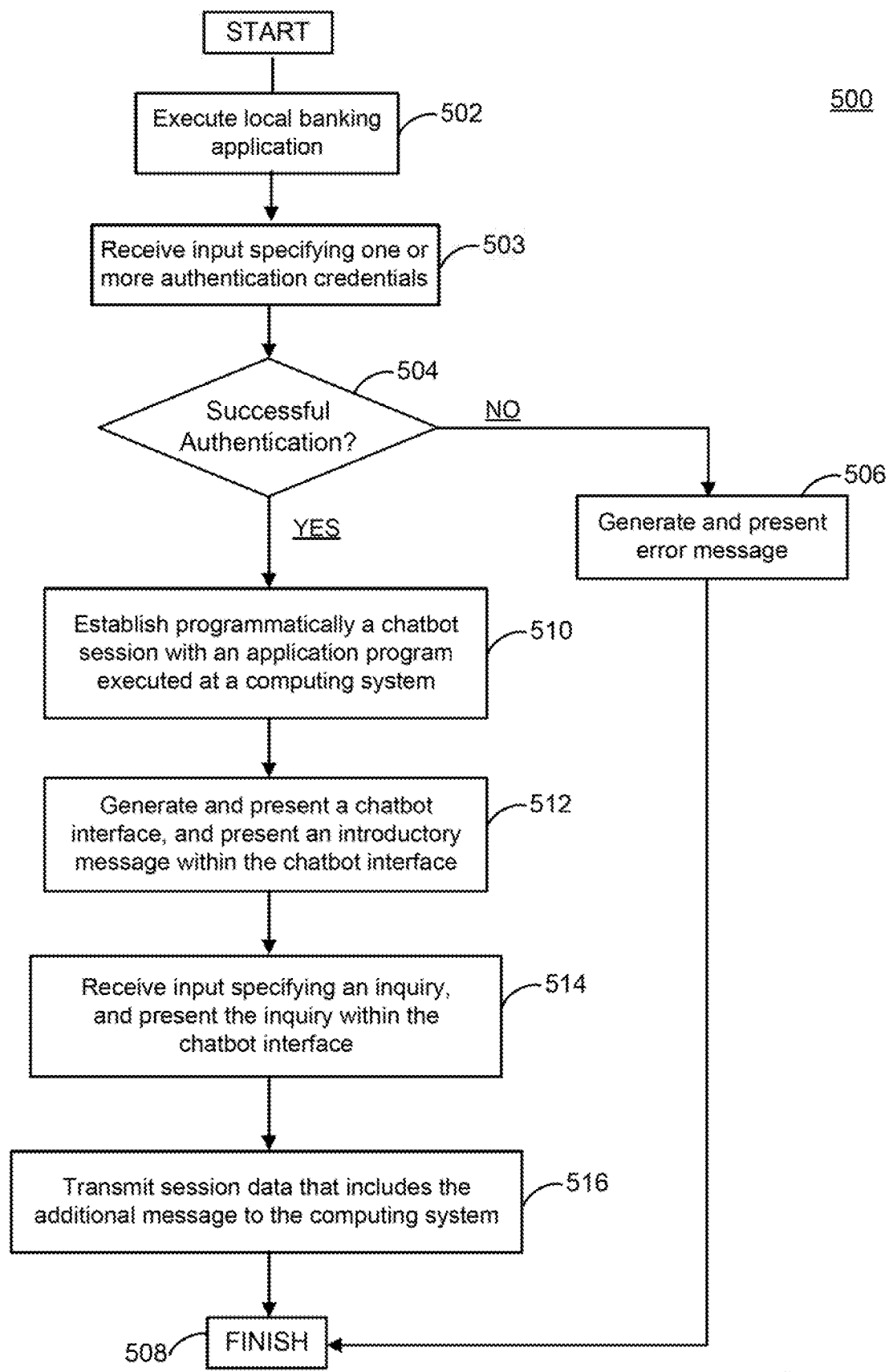
FIGS. 5A, 5B, 6A, 6B, and 6C are flowcharts of exemplary processes for augmenting existing chatbot sessions to include a third party, in accordance with some embodiments.
Figure 5B:
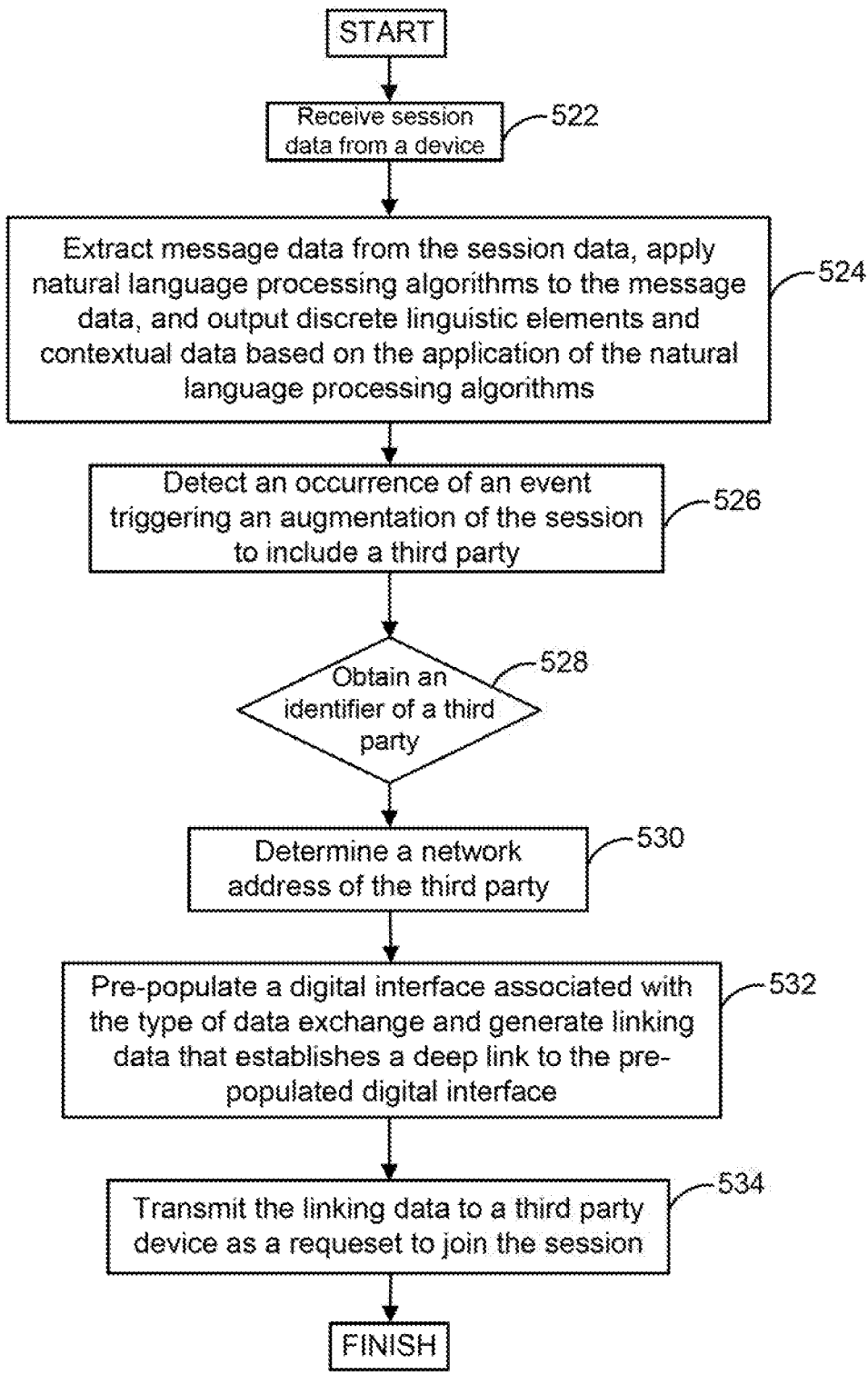

FIGS. 5A and 5B are flowcharts of exemplary processes 500 and 520 for augmenting a programmatically established chatbot session to include a third party, in accordance with the disclosed exemplary embodiments. For example, a network-connected device operating within environment 100, such as client device 102, may perform one or more of the steps of exemplary process 500, and a network-connected computing system operating within environment 100, such as transaction system 130, may perform one or more of the steps of exemplary process 520.

Referring to FIG. 5A, client device 102 may perform operations that, in response to input received from user 101 via input unit 116B, executes a locally maintained application program, such as banking application 108 described herein (e.g., in step 502). By way of example, and as described herein, the input may correspond to a selection by user 101 of an icon of banking application 108 displayed on a pressure-sensitive touchscreen display, such as display unit 116A, e.g., based on an established contact between a stylus or finger and a portion of a surface of the pressure-sensitive touchscreen display associated with the displayed icon.

Client device 102 may, in some instances, receive additional input via input unit 116 that specifies one or more authentication credentials of user 101 (e.g., in step 503). As described herein, examples of these one or more authentication credentials include, but are not limited to, an alphanumeric login credential, an alphanumeric password, or a biometric credential. In some instances, in step 504, client device 102 may perform any of the exemplary processes described herein to authenticate an identity of user 101 based on the one or more authentication credentials.

If client device 102 were unable to authenticate the identity of user 101 (e.g., step 504; NO), client device 102 may perform additional operations that generate and present an error message on display unit 116A (e.g., in step 506). The error message may, in some instances, prompt user 101 to re-enter one or more of the login, authentication, or biometric credentials, or to contact a financial institution associated with executed banking application 108. Exemplary process 500 is then complete in step 508.

Alternatively, if client device 102 were to authenticate the identity of user 101 (e.g., step 504; YES), client device 102 may perform any of the exemplary processes described herein to establish programmatically a chatbot session with an application program executed by a network-connected computing system, such as executed chatbot engine 142 of transaction system 130 (e.g., in step 510). In response to the establishment of the chatbot session, client device 102 may perform any of the exemplary processes described herein to generate, and render for presentation on display unit 116A, a corresponding digital interface (e.g. chatbot interface 200 of FIG. 2A) that includes an introductory message (e.g., introductory message 203 of FIG. 2A) generated programmatically by executed chatbot engine 142 (e.g., in step 512).

In some instances, and in response to the presented introductory message, client device 102 may receive, via input unit 116B, additional user input specifying an inquiry within the ongoing simulated conversation with executed chatbot engine 142, and may perform any of the exemplary processes described herein to generate and present a representation of the inquiry within a portion of the chatbot interface (e.g., in step 514). By way of example, the inquiry may be associated with a request for a banking transaction (e.g., the banking transaction referenced in message 208 of FIG. 2B, stating that "I want to transfer $100 from our checking account to our savings account with Pam's permission"). As described herein, client device 102 may perform any of the exemplary processes described herein to package the received user input into a corresponding portion of session data, along with one of more of a unique identifier of user 101 (e.g., the alphanumeric login name, etc.), client device 102 (e.g., an IP address of MAC address, etc.), or executed banking application 108 (e.g., an application-specific cryptogram), and transmit the session data across network 120 to transaction system 130 (e.g., in step 516). Exemplary process 500 is then complete in step 508.

Referring to FIG. 5B, transaction system 130 may receive the session data from the client device 102 through a secure, programmatic interface (e.g., in step 522). As described herein, the received session data may include message data, which represents the inquiry provided by user 101 as an input to the chatbot interface (e.g., "I want to transfer $100 from our checking account to our savings account with Pam's permission"), along with the identifier of user 101 (e.g., the alphanumeric login credential, etc.), the identifier of client device 102 (e.g., the IP or MAC address, etc.), and/or the identifier of executed banking application 108 (e.g., the application cryptogram).

Transaction system 130 may parse the received session data to extract the message data, and may perform operations that apply any of the exemplary natural language processing algorithms to all or a portion of the extracted message data (e.g., in step 524). Based on the application of these natural language processing algorithms, transaction system 130 may identify one or more discrete linguistic elements (e.g., a word, a combination of morphemes, a single morpheme, etc.) within the message data, and may establish a context and a meaning of combinations of the discrete linguistic elements, e.g., based on the identified discrete linguistic elements, relationships between these discrete linguistic elements, and relative positions of these discrete linguistic elements within the message data (e.g., also in step 524). In some instances, also in step 524, transaction system 130 may generate and output linguistic element data, which includes each of the discrete linguistic elements, and contextual information that specifies the established context or meaning of the combination of the discrete linguistic elements.

In some instances, in step 526, transaction system 130 may perform any of the exemplary processes described herein to determine, based on the discrete linguistic elements and contextual information, an occurrence of an event triggering an augmentation of the chatbot session with the client device 102 to include a third party (e.g., third party 151) For example, transaction system 130 may determine whether the discrete linguistic elements and contextual information include an event identified by trigger data 339, such as a word or words that identify third party 151 (e.g., "Pam"). Alternatively, transaction 130 may determine the occurrence of an event based on consent data 331 that identifies an association of a requested product or service referenced within contextual information 328 with a third party.

In some instances, in step 528, transaction system 130 may perform any of the exemplary processes described herein to obtain an identifier of third party 151, e.g., a third-party identifier. Transaction system 130 may also identify, in step 530, a network address of a third-party device (e.g., third-party device 152), such as by performing operations to access data records of customer database 132, and obtain network address data 338 identifying a network address of third-party device 152.

In some instances, in step 532, transaction system 130 may perform any of the exemplary processes described herein to generate and locally store populated interface data that provisions the existing chatbot session for client device 102 to a chatbot interface presented by an additional application program, such as banking application 108 of FIG. 1, when executed by third-party device 152. For example, the populated interface data may include chatbot session data that characterizes prior messages exchanged between client device 102 and transaction system 130 during the existing chatbot session between transaction system 130 and client device 102 and during one or more prior chatbot sessions.

In some instances (also at step 532), transaction system 130 may perform any of the exemplary processes described here to generate a deep link to the locally maintained elements of the prepopulated interface data. In some instances, transaction system 130 may generate linking data in step 532 that identifies and characterizes the generated deep link, and may perform operations that stores the linking data within the data records of one or more non-transitory memories.

Further, and as described herein, transaction system 130 may generate a notification that includes the generated deep link, and may transmit the generated notification across network 120 to the network address of third-party device 152 (e.g., in step 534). By way of example, and when processed by the additional application program executed by third-party device 152, the notification may cause third-party device 152 to present, within a corresponding digital interface, one or more interface elements that request the third party join the existing chatbot session, and that prompt the third party to provide one or more authentication credentials, e.g., via a corresponding input unit. Exemplary process 520 is then complete in step 536.

Figure 6A:
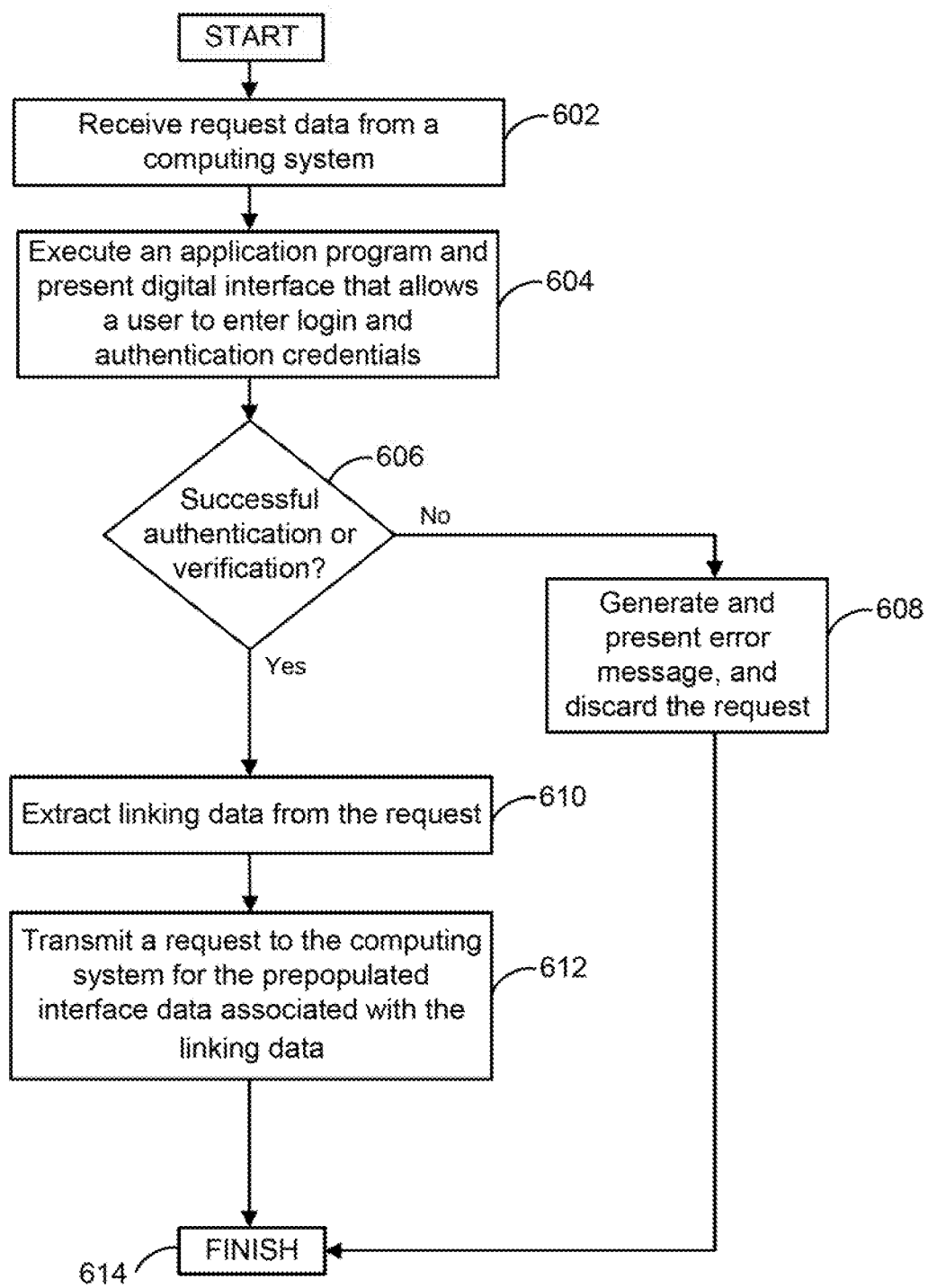
Figure 6B:
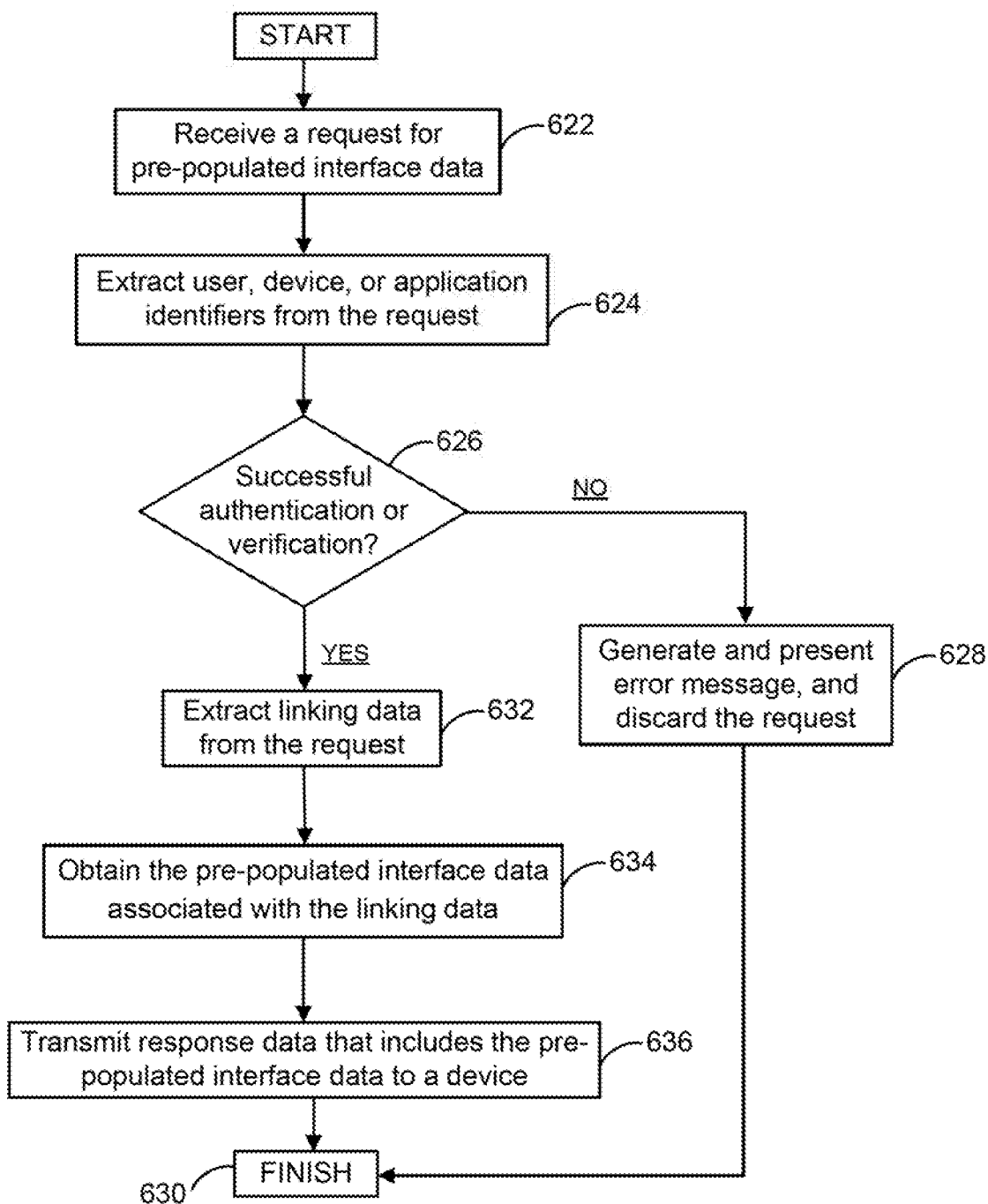
Figure 6C:
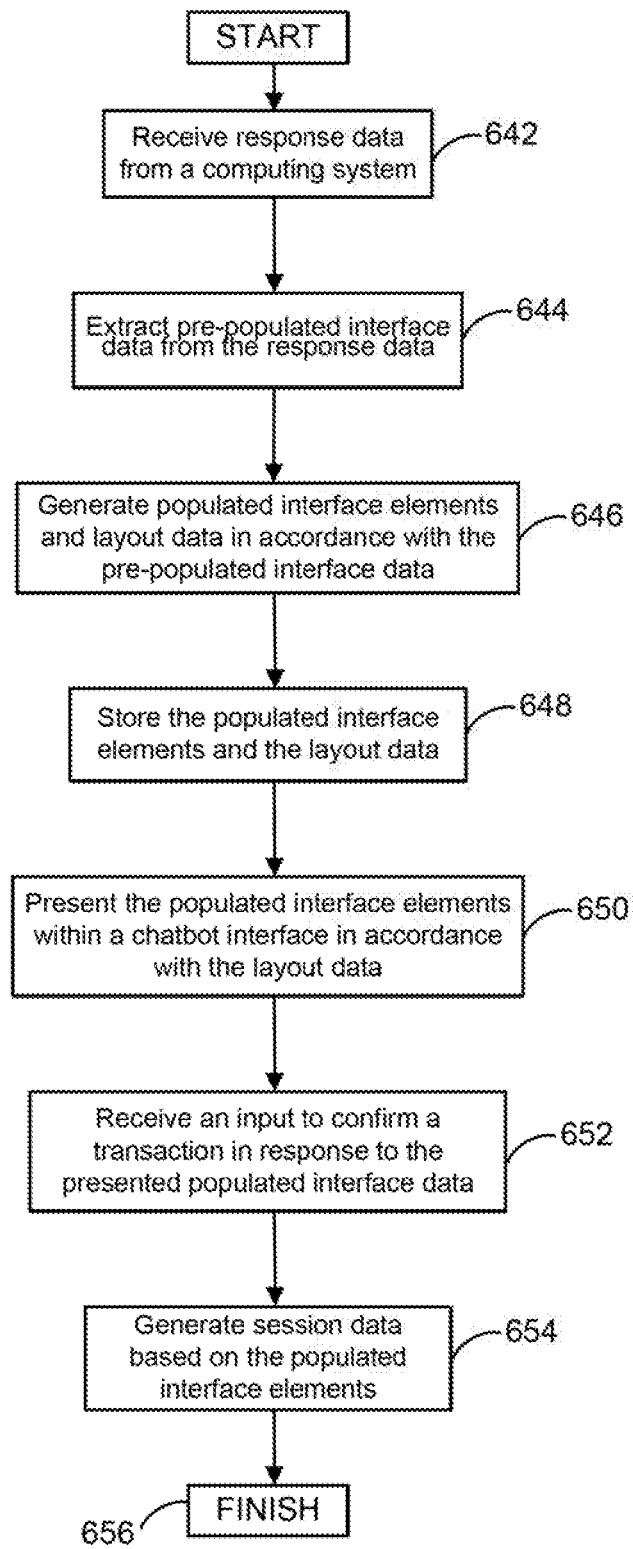

FIGS. 6A, 6B, 6C are flowcharts of exemplary processes 600, 620, and 640 for augmenting a programmatically established chatbot session to include a third party, in accordance with the disclosed exemplary embodiments. For example, a network-connected device operating within environment 100, such as third-party device 152, may perform one or more of the steps of exemplary process 600 and 640, while a network-connected computing system operating within environment 100, such as transaction system 130, may perform one or more of the steps of exemplary process 620.

Referring to FIG. 6A, third-party device 152 may receive a notification from one or more network-connected computing system operating within environment 100, e.g., transaction system 130 of FIG. 1, across a secure, programmatic interface (e.g., in step 602). For example, and as described herein, third-party device 152 may determine that the notification includes a request to join the ongoing and simulated conversation between user and a programmatically generated chatbot established by transaction system 130, e.g., by executed chatbot engine 142 using any of the exemplary processes described herein.

In response to the received notification, third-party device 152 may execute an additional application program, such as banking application 108, previously provisioned to third-party device 152 by transaction system 130, and perform any of the exemplary processes described herein to present a digital interface to third party 151 that prompts third party 151 to provide one or more authentication credentials (e.g., in step 604).

In some instances, (e.g., in step 606), third-party device 152 may perform any of the exemplary processes described herein to authenticate an identity of third party 151 or third-party device 152 (e.g., based on portions of the authentication credentials). If third-party device 152 were unable to authenticate the identity of third party 151 or third-party device 152 (e.g., step 606; NO), third-party device 152 may generate and transmit an error message indicative of the failed authentication or verification across network 120 to transaction system 130 and may perform operations that discard the received request data (e.g., in step 608). Exemplary process 620 is then complete in step 614.

In other instances, and in response to a successful authentication of the identity of third party 151 or third-party device 152 (e.g., step 606; YES), third-party device 152 may parse the notification (e.g., in step 610) to extract all or a portion of the linking data, which identifies and characterizes a deep link to pre-populated interface data maintained at transaction system 130, and textual content, which characterizes the deep link and the corresponding pre-populated digital interface. By way of example, the pre-populated interface data may associate interface elements disposed within a digital interface (e.g., the chatbot interface 200 described herein) with corresponding spatial positions within the digital interface, and textual content may characterize the deep link.

Further, third-party device 152 may perform any of the exemplary processes described herein to package all or a portion of the linking data into a corresponding portion of a request for the prepopulated interface data associated with the deep link (e.g., in step 612). In some instances, the generated request 406 also includes the unique identifier of third party 151 (e.g., the alphanumeric login credential of third party 151), the unique device identifier of third-party device 152 (e.g., the IP or MAC address of third-party device 152) and additionally, or alternatively, the unique identifier of banking application 108 (e.g., the application-specific cryptogram described herein). Third-party device 152 may perform additional operations that transmit the generated request across network 120 to transaction system 130 (e.g., in step 612). Exemplary process 600 is then complete in step 614.

Referring to FIG. 6B, transaction system 130 may receive the generated request from third-party device 152 via a secure, programmatic interface (e.g., in step 622). As described herein, the generated request may include at least a portion of the linking data and in some instances, may also include the unique identifier of third party 151 (e.g., the alphanumeric login credential of third party 151), the unique device identifier of third-party device 152 (e.g., the IP or MAC address of third-party device 152) and additionally, or alternatively, the unique identifier of banking application 108 (e.g., the application-specific cryptogram described herein). By way of example, transaction system 130 may parse the request and extract the unique identifiers of third party 151, third-party device 152, or executed banking application 108 (e.g., in step 624). In step 626, transaction system 130 may perform any of the exemplary processes described herein to authenticate an identity of third party 151 or third-party device 152 (e.g., based on portions of the unique identifiers of third party 151 or third-party device 152) or to verify an authenticity of the generated request (e.g., based on the unique identifier of executed banking application 108, such as an application cryptogram).

If transaction system 130 were unable to authenticate the identity of third party 151 or third-party device 152, or to verify the authenticity of the request (e.g., step 626; NO), transaction system 130 may generate and transmit an error message indicative of the failed authentication or verification across network 120 to third-party device 152 and may perform operations that discard received the request (e.g., in step 628). Exemplary process 620 is then complete in step 630.

In other instances, and in response to a successful authentication of the identity of third party 151 or third-party device 152 and/or a successful verification of the authenticity of the request (e.g., step 626; YES), transaction system 130 may parse the request to extract all or a portion of the linking data (e.g., in step 632). Based on the extracted linking data, transaction system 130 may perform any of the exemplary processes described herein to obtain one or more elements of prepopulated interface data associated with the linking data (e.g., in step 634). Transaction system 130 may perform additional operations that package the extracted elements of prepopulated interface data, which may identify or characterize session data related to existing chatbot session established programmatically between client device 102 and transaction system 130, into corresponding portions of response data (e.g., in step 636). Transaction system 130 may then transmit the corresponding portions of response data across network 120 to a unique network address of third-party device 152 (e.g., also in step 636). Further, although not illustrated in FIG. 6B, transaction system 130 may perform any of the exemplary operations to augment the existing chatbot session with client device 102 to include third-party device 152. Exemplary process 620 is then complete in step 630.

Referring to FIG. 6C, third-party device 152 may receive the response data via a secure programmatic interface (e.g., in step 642), and may parse the response data to extract the elements of prepopulated interface data (e.g., in step 644). In some instances, third-party device 152 may perform any of the exemplary processes described herein to generate populated interface elements, which correspond to the interface elements of the chatbot interface 200, and layout data, which specifies a size, position, or visual characteristic (e.g., color, etc.) of each of the populated interface elements when presented on display unit 116A (e.g., in step 646). Third-party device 152 may also perform operations that store the populated interface elements and the layout data within a tangible, non-transitory memory (e.g., in step 648). Further, third-party device 152 may also perform operations that present each of the populated interface elements within the chatbot interface, e.g., chatbot interface 400 of FIG. 4B, in accordance with corresponding portions of the layout data (e.g., in step 650).

In some instances, in step 652, third-party device 152 may receive additional input, via the corresponding input unit, that indicates the approval of or consent to a data exchange requested by user 101 during the existing chatbot session (e.g., "I want to transfer $100 from our checking account to our savings account with Pam's permission" in message 434 of FIG. 4B). For example, third party 151 may provide additional input to third-party device 152 that specifies a response message providing the requested approval or consent (e.g., "Yes go ahead" in message 436 of FIG. 4B).

In response to the received input, third-party device 152 may perform any of the exemplary processes described herein to parse the submitted message 436 into corresponding portions of session data (e.g., in step 654). In some instances, session data 485 may also include the unique identifier of third party 151 (e.g., the alphanumeric login credential of third party 151), the unique device identifier of third-party device 152 (e.g., the IP or MAC address of third-party device 152) and additionally, or alternatively, the unique identifier of the executed additional application (e.g., the application-specific cryptogram described herein). Third-party device 152 may perform operations to transmit the session data across network 120 to a unique network address of transaction system 130. Exemplary process 640 is then complete in step 654.

III. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Exemplary embodiments of the subject matter described in this specification, including banking application 108, chatbot engine 142, NLP engine 144, event detection engine 148, third-party chat request engine 149, APIs 320, 366, 410, 416, and 480, initialization module 232, session management module 324, event detection module 330, third-party determination module 334, deep link generation module 352, message generation module 358, routing modules 364 and 408, interface processing module 368, interface element generation module 370, triggering module 404, and interface provisioning module 412, and can be implemented as one or more computer programs, i.e., one or more modules of computer program instructions encoded on a tangible non transitory program carrier for execution by, or to control the operation of, a data processing apparatus (or a computer system).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including, by way of example, a programmable processor such as a graphical processing unit (GPU) or central processing unit (CPU), a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array), an ASIC (application-specific integrated circuit), one or more processors, or any other suitable logic.

Computers suitable for the execution of a computer program include, by way of example, general or special purpose microprocessors or both, or any other kind of central processing unit. Generally, a CPU will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
   a communications interface;
   a memory storing instructions; and
   at least one processor coupled to the communications interface and the memory, the at least one processor being configured to execute the instructions to:
   receive, via the communications interface, messaging data from a first device, the messaging data being generated by a first application program executed by the first device during a first communications session involving the executed first application program;
   based on the messaging data, detect an occurrence of an event that triggers an establishment of a second communications session involving the first device and a second device;

generate and transmit, via the communications interface, a first signal to the second device that includes notification data associated with the second communications session, the notification data causing a second application program executed by the second device to present, within a digital interface, interface data that requests a validation of one or more authentication credentials;

receive, via the communications interface, a second signal from the second device, the second signal comprising confirmation data indicative of the one or more validated authentication credentials; and based on the confirmation data, perform operations that establish the second communications session between the first device and the second device and that provision a portion of the messaging data to the second application program executed by the second device, the executed second application program presenting the portion of the messaging data within the digital interface during the second communications session.

2. The apparatus of claim 1, wherein the at least one processor is further configured to:
establish the first communications session with a first application program executed by the first device; and
establish the second communications session with the first application program and with a second application program executed by the second device.

3. The apparatus of claim 1, wherein:
the at least one processor is further configured to generate linking data associated with the interface data, the interface data being stored within the memory, and the interface data comprising information displayed within an additional digital interface generated by the executed first application program;
the notification data associated with the second communications session includes the linking data; and
the confirmation data comprises at least a portion of the linking data.

4. The apparatus of claim 3, wherein the at least one processor is further configured to:
based on the received confirmation data, load the interface data from the memory; and
transmit, via the communications interface, a fourth signal that includes the interface data to the second device.

5. The apparatus of claim 4, wherein the fourth signal comprises additional information that causes the executed second application program to present the interface data within a portion of the digital interface.

6. The apparatus of claim 1, wherein:
the second device is associated with a third party; and
the at least one processor is further configured to:
determine that the messaging data includes information associated with the third party; and
detect the occurrence of the event based on the determination that the messaging data includes the information associated with the third party.

7. The apparatus of claim 6, wherein the information associated with the third party comprises at least one of (i) a portion of a name of the third party or (ii) an identifier of a relationship between the third party and a user of the first device.

8. The apparatus of claim 6, wherein the at least one processor is further configured to:
determine that the messaging data includes information identifying a product or a service;
based on obtained consent data, establish an association between the identified product or service and the third party; and
detect the occurrence of the event based on the established association between the identified product or service and the third party.

9. The apparatus of claim 1, wherein the at least one processor is further configured to detect the occurrence of the event based on an application of a statistical process, a machine learning process, or an artificial intelligence process to at least a portion of the messaging data.

10. The apparatus of claim 1, wherein the at least one processor is further configured to:
identify one or more discrete linguistic elements within the messaging data based on an application of a statistical process, a machine learning process, or an artificial intelligence process to portions of the messaging data; and
detect the occurrence of the event that triggers the establishment of the second communications session based on the one or more discrete linguistic elements.

11. A computer-implemented method, comprising:
obtaining, by at least one processor, messaging data from a first device, the messaging data being generated by a first application program executed by the first device during a first communications session involving the executed first application program;
based on the messaging data, detecting, by the at least one processor, an occurrence of an event that triggers an establishment of a second communications session involving the first device and a second device;
generating and transmitting, by the at least one processor, notification data associated with the second communications session to the second device, the notification data causing a second application program executed by the second device to present, within a digital interface, interface data that requests a validation of one or more authentication credentials;
receiving, by the at least one processor, confirmation data indicative of the one or more validated authentication credentials from the second device; and
based on the confirmation data, and by the at least one processor, performing operations that establish the second communications session between the first device and the second device and that provision a portion of the messaging data to the second application program executed by the second device, the executed second application program presenting the portion of the messaging data within the digital interface during the second communications session.

12. The computer-implemented method of claim 11, wherein:
the computer-implemented method further comprises generating, by the at least one processor, linking data associated with the interface data, the interface data being stored within a memory, and the interface data comprising information displayed within an additional digital interface generated by the executed first application program;
the notification data associated with the second communications session includes the linking data; and
the confirmation data comprises at least a portion of the linking data.

13. The computer-implemented method of claim 12, wherein:

the computer-implemented method further comprises, based on the received confirmation data, and by the at least one processor, loading the interface data from the memory; and wherein performing the operations that establish the second communications session comprises transmitting a fourth signal that includes the interface data to the second device, the fourth signal comprising additional information that causes the executed second application program to present the interface data within a portion of the digital interface that includes a portion of the stored interface data.

14. The computer-implemented method of claim 11, wherein:
the second device is associated with a third party; and
the computer-implemented method further comprises:
determining, by the at least one processor, that the messaging data includes information associated with the third party; and
detecting, by the at least one processor, the occurrence of the event based on the determination that the messaging data includes the information associated with the third party.

15. The computer-implemented method of claim 14, wherein the information associated with the third party comprises at least one of (i) a portion of a name of the third party or (ii) an identifier of a relationship between the third party and a user of the first device.

16. The computer-implemented method of claim 14, wherein:
the method further comprises:
determining, by the at least one processor, that the messaging data includes information identifying a product or a service; and
based on obtained consent data, and by the at least one processor, establishing an association between the identified product or service and the third party; and
the detecting comprises detecting the occurrence of the event based on the established association between the identified product or service and the third party.

17. The computer-implemented method of claim 11, wherein the detecting comprises detecting the occurrence of the event based on an application of a statistical process, a machine learning process, or an artificial intelligence process to at least a portion of the messaging data.

18. The computer-implemented method of claim 11, wherein:
the method further comprises identifying, by the at least one processor, one or more discrete linguistic elements within the messaging data based on an application of a statistical process, a machine learning process, or an artificial intelligence process to portions of the messaging data; and
the detecting comprises detecting the occurrence of the event that triggers the establishment of the second communications session based on the one or more discrete linguistic elements.

19. A tangible, non-transitory computer-readable medium storing instructions that, when executed by at least one processor, cause the at least one processor to perform a method, comprising:
obtaining messaging data from a first device, the messaging data being generated by a first application program executed by the first device during a first communications session involving the executed first application program;
based on the messaging data, detecting an occurrence of an event that triggers an establishment of a second communications session involving the first device and a second device;
generating and transmitting notification data associated with the second communications session to the second device, the notification data causing a second application program executed by the second device to present, within a digital interface, interface data that requests a validation of one or more authentication credentials;
receiving confirmation data indicative of the one or more validated authentication credentials from the second device; and
based on the confirmation data, perform operations that establish the second communications session between the first device and the second device and that provision a portion of the messaging data to the second application program executed by the second device, the executed second application program presenting the portion of the messaging data within the digital interface during the second communications session.

20. The apparatus of claim 1, wherein:
the first communications session comprises a chatbot session established by the first application program; and
the second communications session comprises an augmented chatbot session involving the first application program and the second application program.

* * * * *